US007792700B2

(12) United States Patent
Dubin et al.

(10) Patent No.: US 7,792,700 B2
(45) Date of Patent: Sep. 7, 2010

(54) METHODS AND COMPUTER-READABLE STORAGE DEVICES FOR MANAGING TRANSACTIONS WITH MULTIPLE BROKER AFFILIATES

(75) Inventors: Jacob M. Dubin, Lees's Summit, MO (US); Jerry L. Thompson, Shawnee, KS (US)

(73) Assignee: Stubhub, Inc., San Francisco, CA (US)

( * ) Notice: Subject to any disclaimer, the term of this patent is extended or adjusted under 35 U.S.C. 154(b) by 1328 days.

(21) Appl. No.: 10/606,086

(22) Filed: Jun. 25, 2003

(65) Prior Publication Data

US 2005/0015303 A1 Jan. 20, 2005

(51) Int. Cl.
  *G06Q 30/00* (2006.01)
(52) U.S. Cl. .................. 705/26; 705/1; 705/27
(58) Field of Classification Search ............ 705/1, 705/26, 27
  See application file for complete search history.

(56) References Cited

U.S. PATENT DOCUMENTS

| | | | | |
|---|---|---|---|---|
| 6,219,653 | B1* | 4/2001 | O'Neill et al. | 705/400 |
| 7,216,109 | B1* | 5/2007 | Donner | 705/64 |
| 2002/0082956 | A1* | 6/2002 | Peterson et al. | 705/28 |
| 2002/0120506 | A1* | 8/2002 | Hagen | 705/14 |
| 2002/0128922 | A1* | 9/2002 | Joao | 705/26 |
| 2002/0138399 | A1* | 9/2002 | Hayes et al. | 705/37 |
| 2002/0174028 | A1* | 11/2002 | Anderson et al. | 705/26 |
| 2003/0236736 | A1* | 12/2003 | Harmon et al. | 705/37 |
| 2004/0111303 | A1* | 6/2004 | Francis | 705/5 |
| 2005/0246245 | A1* | 11/2005 | Satchell et al. | 705/26 |

OTHER PUBLICATIONS

"Spring's the season for scalpers Bill would legalize ticket brokering;" Walter C. Jones, Florida Times Union. Jacksonville, Fla. Apr. 2, 2000. Retrieved via ProQuest.*
Ticket Solutions, Inc., sales brochure.

* cited by examiner

*Primary Examiner*—Jeffrey A. Smith
*Assistant Examiner*—Michael A. Misiaszek

(57) ABSTRACT

A distributed network transaction system and method includes a central exchange computer connected via the Internet (world wide web) to multiple remote computers associated with, for example, individual brokers. A central database is provided with the exchange computer and each remote computer can have a respective database for information that the individual brokers was to maintain separate from the system. E-commerce transactions are conducted by the system, which performs a number of transaction-related functions, such as pushing tickets up to the system for sale, purchasing tickets online, shipping, web site-related and bookkeeping. The system and methodology accommodate price event functions where non real-time tickets can be sold and the orders filled with tickets acquired on the system.

20 Claims, 69 Drawing Sheets

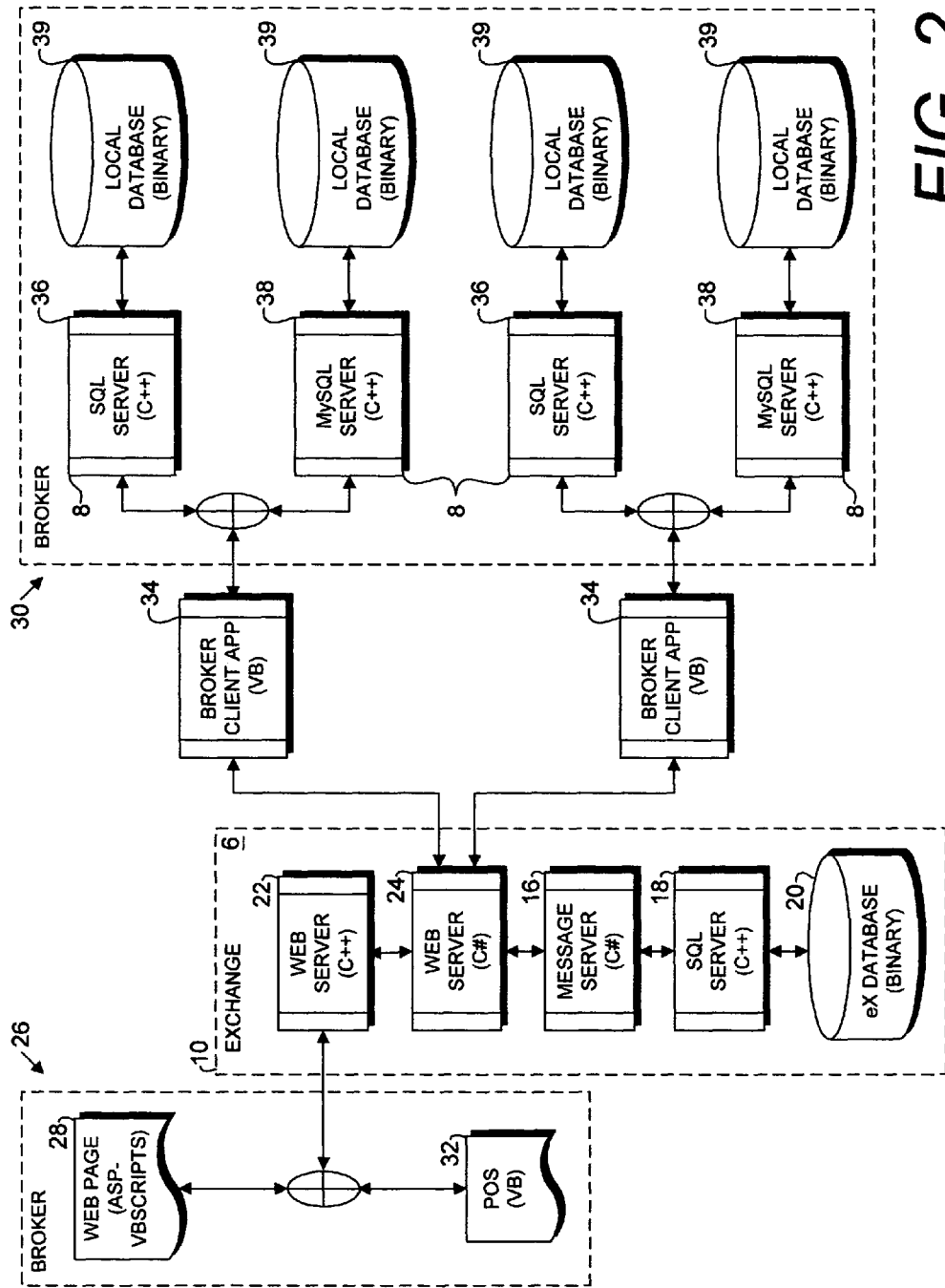

| RULE | EFFECTS | WHERE | TYPE |
|---|---|---|---|
| Show my ticket group(s) everywhere | My Tickets | Everywhere | Show Mode |
| Show my ticket group(s) on my website | My Tickets | My Website | Show Mode |
| Don't show my ticket group(s) on my website | My Tickets | My Website | Show Mode |
| Show my ticket group(s) on this broker's website | My Tickets | Others Website | Show Mode |
| Don't show my ticket group(s) on this broker's website | My Tickets | Others Website | Show Mode |
| Show my ticket group(s) on my eXchange | My Tickets | My eXchange | Show Mode |
| Don't show my ticket group(s) on my eXchange | My Tickets | My eXchange | Show Mode |
| Show my ticket group(s) on this broker's eXchange | My Tickets | Others eXchange | Show Mode |
| Don't show my ticket group(s) on this broker's eXchange | My Tickets | Others eXchange | Show Mode |
| Show this broker's ticket group(s) on my website | Others Tickets | My Website | Show Mode |
| Don't show this broker's ticket group(s) on my website | Others Tickets | My Website | Show Mode |
| Show this broker's ticket group(s) on my eXchange | Others Tickets | My eXchange | Show Mode |
| Don't show this broker's ticket group(s) on my eXchange | Others Tickets | My eXchange | Show Mode |
| Markup my ticket group(s) on my website | My Tickets | My Website | Markup |
| Markup this broker's ticket group(s) on my website | Others Tickets | My Website | Markup |
| Only show my ticket group(s) on my website | My Tickets/Others Tickets | My Website | Show Mode |
| Only show my ticket group(s) on my eXchange | My Tickets/Others Tickets | My eXchange | Show Mode |
| Don't show any ticket group(s) on my website | My Tickets/Others Tickets | My Website | Show Mode |
| Don't show any ticket group(s) on my eXchange | My Tickets/Others Tickets | My eXchange | Show Mode |
| Only show my ticket group(s) on my website (Qty Limited) | My Tickets/Others Tickets | My Website | Show Mode |

FIG. 3

You can create non real-time tickets that will show up in the system. If the tickets are not real, you must mark them fake so they will not show up on other broker's websites. This is the default.

SEARCH SOS EVENTS

EVENT NAME
VENUE NAME
EVENT DATE

[SEARCH]

TICKET INFORMATION

SECTION                ☑ SHOW ON THE WEB

ROW                    ☐ SHOW ON EXCHANGE

FIRST SEATS (01-10)

QUANTITY  [1 ▼]

LIST PRICE             ☑ FAKE TICKETS

FACE                   ☑ ALLOW SPLITTING
                         OF TICKET GROUP

[ADD TICKETS]

*FIG. 6*

These rules denote how many tickets you will sell from a package of tickets. For example, if you have 4 tickets, you would by default sell 4 or 2 tickets, but not 3 or 1, which would leave you with a single. You can change this behavior here.

[Save]　　　　　　　　　　　　　　　　　　　　　　[Defaults]

| QTY | POSSIBLE SPLITS |
|---|---|
| 2 | 2 |
| 3 | 3,1 |
| 4 | 4,2 |
| 5 | 5,3,2,1 |
| 6 | 6,4,2 |
| 7 | 7,5,4,3,2,1 |
| 8 | 8,6,4,2 |
| 9 | 9,7,6,5,4,3,2,1 |
| 10 | 10,8,6,4,2 |
| 11 | 11,9,8,7,6,5,4,3,2,1 |
| 12 | 12,10,8,6,4,2 |
| 13 | 13,11,10,9,8,7,6,5,4,3,2,1 |
| 14 | 14,12,10,8,6,4,2 |
| 15 | 15,13,12,11,10,9,8,7,6,5,4,3,2,1 |
| 16 | 16,14,12,10,8,6,4,2 |
| 17 | 17,15,14,13,12,11,10,9,8,7,6,5,4,3,2,1 |
| 18 | 18,16,14,12,10,8,6,4,2 |
| 19 | 19,17,16,15,14,13,12,11,10,9,8,7,6,5,4,3,2,1 |
| 20 | 20,18,16,14,12,10,8,6,4,2 |

*FIG. 7*

BROKER SETTINGS

CREDIT CARD

This is the credit card that will be used to buy tickets from other brokers on credit card items:

CARD NUMBER:
NAME ON THE CARD:
CARD EXPIRATION:
CARD TYPE:

CREDIT CARD PROCESSOR

Be sure to leave this blank if you are not currently using a service.

PROCESSOR: ⦿ Verisign  ○ Authorize Net  ○ None
PARTNER: Verisign
USERNAME:
PASSWORD:

DOMAINS:

| ID | DOMAIN | FULL CHARGE | AUTH 1$ | NONE | CSC |
|----|--------|-------------|---------|------|-----|
| 1 | ticketsolutions.com | ○ | ⦿ | ○ | ☐ |
| 3 | priceeventweb.com | ○ | ○ | ⦿ | ☐ |
| 45 | tickets4u.com | ○ | ○ | ⦿ | ☐ |

WEBSITE

Rules for marking up the price on your tickets, and other brokers tickets.

DEFAULT MARKUP: 40%
DEFAULT MARKUP (MY TIX): 0%
MINIMUM MARKUP: 35
HANDLING FEE: 0%
WEBSALE CUTOFF: 48 Hours

[Update]

*FIG. 8*

- site selection
- upload
- URL builder
- default page
- change header
- change footer
- about page
- privacy policy
- terms of use
- colors & fonts
- confirm e-mail
- contact e-mail
- e-mail's header
- refresh website
- event calendar
- HotEvents editor Which website do you want to edit?

ticketsolutions.com

[ Select Domain ]

*FIG. 9*

TRANSACTION STEPS
---------------------------

1) webservice sends request
2) server parses and builds request documents
3) server sends request to app #1
4) app #1 sends back tickets
5) server sends sell document to app #2
6) app #2 issues back confirm
7) server sends confirm to webservice
8) webservice issues a CLOSE CON
9) server sends acknowledgment to app #2
10) app #2 issues CLOSE CON
11) server sends acknowledgment to app #1
12) app #1 acknowledges CON CLOSED
13) server sends acknowledgment to webservice
---------------------------

*FIG. 10*

Enterprise:

3. Create Mass PO Tickets

When view has been complete, Select "Create and Add to Mass PO"

Search for the Customer information, if necessary add the customer information to the database Select "Purchase"

Select "Yes" to sell the tickets now. You will then be taken to the Sales, Inventory screen Sell Tickets?

Would you like to add these tickets to your shopping cart to sell them now?

Yes    No

FIG. 15

4. Mass PO

Use to search for Mass POs, Advanced Quotes or Cancelled POs.

FIG. 16

5. Advanced Quotes

Tasks

- Find PO's (CTRL-F)...
- Print PO (CTRL+P)...
- View PO (CTRL+V)...
- View Mass PO (CTRL+M)

Ability to Search for a particular PO, Print the PO and view the PO

• Review Sold Tickets on Advanced Quotes

| PO | Event | Event Date | Venue | AvgFace | AvgCost | AvgSoldFor | Section | Row | Seats | Customer |
|---|---|---|---|---|---|---|---|---|---|---|
| | | | | | | | | | | |
| 40547 | Dallas Cowboys vs | 11/24/2002 | Texas Stadium | $0.00 | $0.00 | $50.00 | 06 | 38 | 105-106 | ROBERT MARSHALL |
| | | | | | | | | | | |
| 44177 | George Strait | 2/28/2003 | Freedom Hall (Center | $0.00 | $64.87 | $150.00 | SEC 11 | G | 07-08 | TICKETMASTER TICKE |
| | | | | | | | | | | |
| 40325 | Hairspray | 12/3/2002 | Neil Simon Theatre | $0.00 | $0.00 | $200.00 | ORCH | S | 17-19 | WARREN KANTOR |
| | | | | | | | | | | |
| 42197 | Phish | 2/18/2003 | Pepsi Center (End | $0.00 | $42.11 | $90.00 | 308 | 15 | 10-11 | PHISH FAN CLUB |
| | Phish | | Pepsi Center End | $0.00 | | | | 06 | | |
| 42129 | Phish | 2/18/2003 | Pepsi Center End | $0.00 | $42.20 | $75.00 | 328 | 11 | 09-12 | PHISH FAN CLUB |
| | | | | | | | | | | |
| 38320 | Rolling Stones | 10/12/2002 | Ford Field (Stones) | $50.00 | $107.27 | $107.27 | 105 | 31 | 01-10 | TICKETMASTER TICKE |
| | | | | | | | | | | |
| 43017 | St Louis Rams vs San | 12/30/2002 | Edward Jones Dome | $0.00 | $0.00 | $20.00 | 405 | A | 04-05 | NICK METZGER |

*FIG. 17*

* For tickets sold on an Advanced Quote, PO must be complete for accounting purposes.

6. PO Queue

Contains queued data from Non-Real Time sales off the Exchange, which can be edited and matched against an event and then completed into a Completed PO.

2. Order Completion

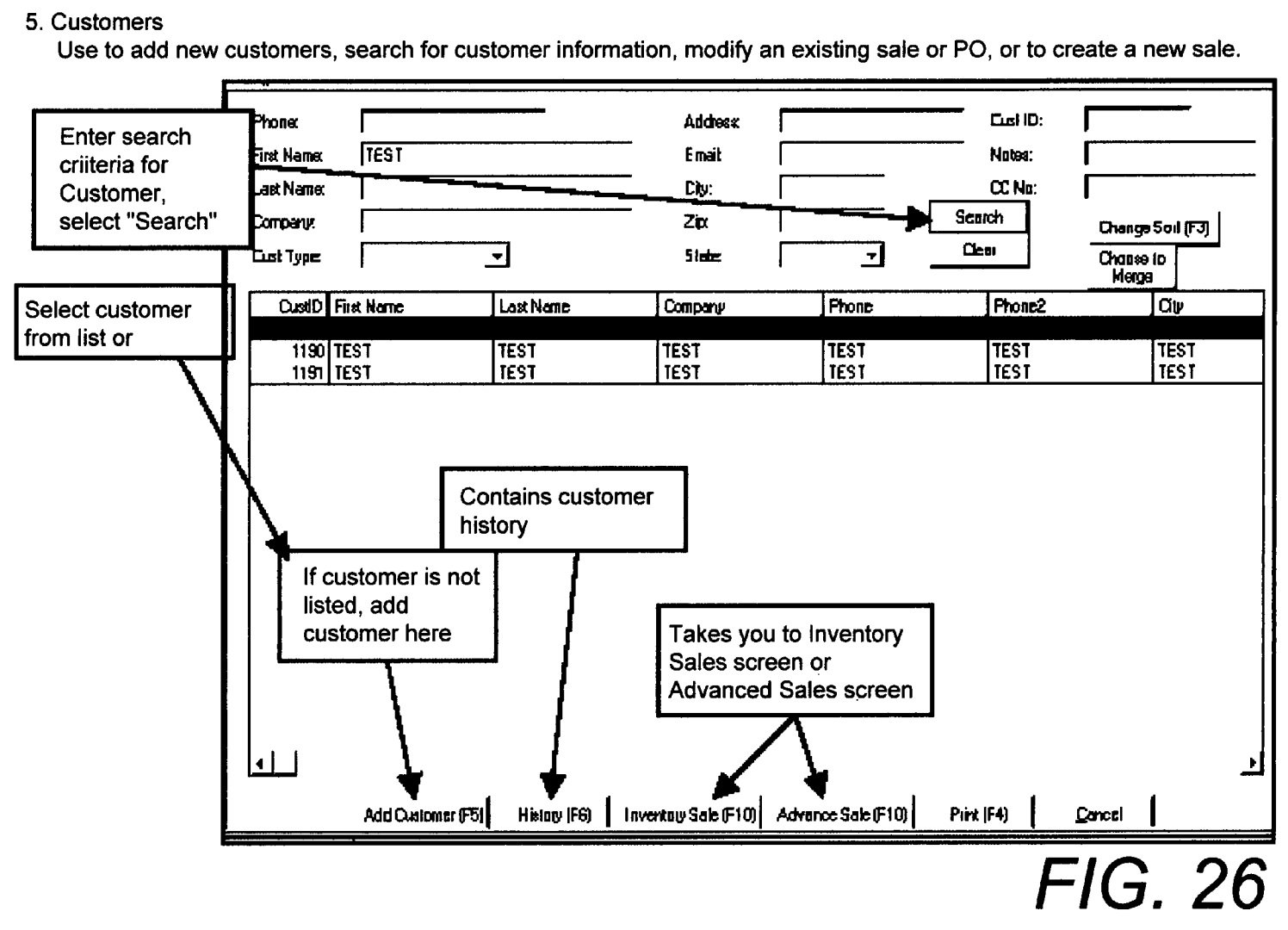

5. Customers
Use to add new customers, search for customer information, modify an existing sale or PO, or to create a new sale.

FIG. 26

6. Exchange Brokers

Broker ID #1
Ticket Solutions
11900 College Blvd
Suite 315
Overland Park, KS

Phone: 800-477-5285
Phone2: 913-384-4751
Fax 913-451-7832

E-Mail support@ticketsolutions.com
Web: http://www.ticketsolutions.com/

1 Ticket Solutions
Overland Park, KS

2 Great Seats
College Park, MD

3 Stage Front
Laurel, MD

Click on Broker name to retrieve address, phone number and further information for particular broker

FIG. 27

Manage
1. Inventory

FIG. 28

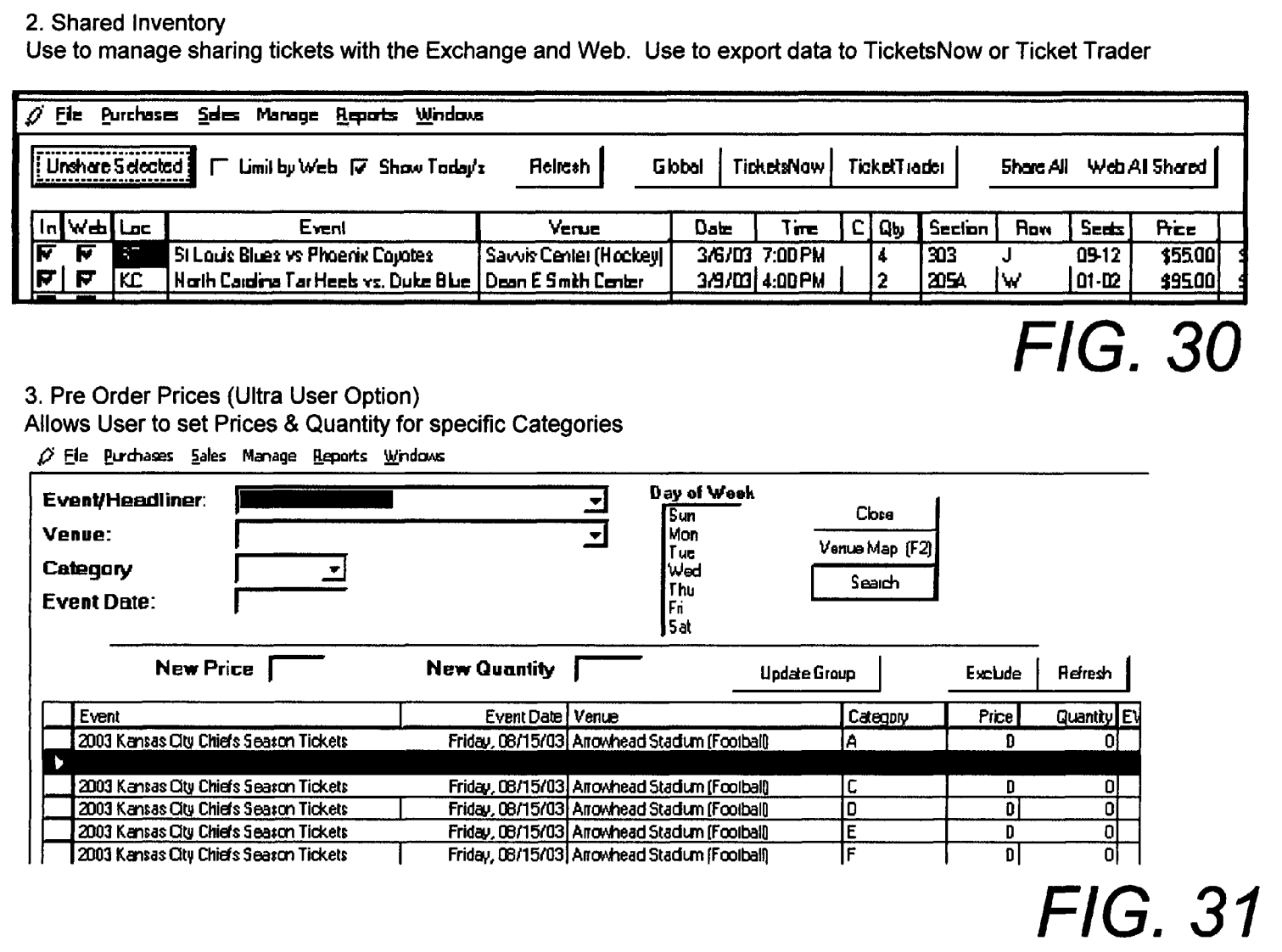

2. Shared Inventory
Use to manage sharing tickets with the Exchange and Web. Use to export data to TicketsNow or Ticket Trader

*FIG. 30*

3. Pre Order Prices (Ultra User Option)
Allows User to set Prices & Quantity for specific Categories

*FIG. 31*

5. Buyers/Credit Cards
Modify & Add to Buyer/Credit Card list.

FIG. 32

7. Field Values
Use to add, delete or modify options for: customer types, office locations, shipping types or discounts to the database 8. Referral List
Add/Delete Customer Referrals.

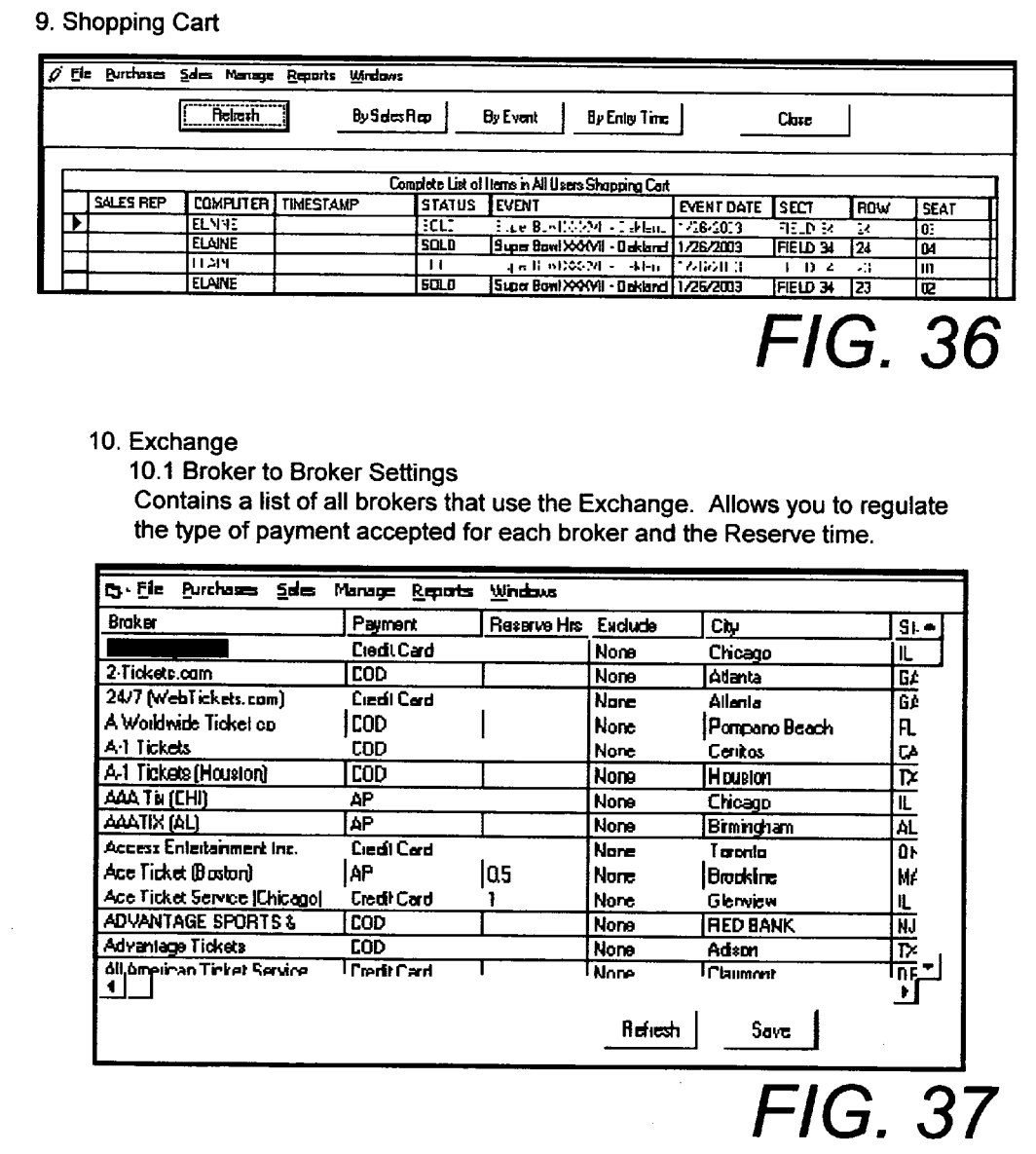

9. Shopping Cart

*FIG. 36*

10. Exchange
    10.1 Broker to Broker Settings
    Contains a list of all brokers that use the Exchange. Allows you to regulate the type of payment accepted for each broker and the Reserve time.

*FIG. 37*

3. Event Reports
  3.1 Event Range
  Select Date Rande, Sorts by Event Name

| | Event Report | | | |
|---|---|---|---|---|
| 1/15/2003 | | | | |
| Date | Event | Venue | Sold | Available |
| 1/12/03 | Chicago Blackhawks vs Nashville Pred | United Center (Hockey) | | 4 |
| 12/16/02 | Chicago Bulls vs Boston Celtics | United Center (Basketball) | | 2 |
| 12/27/02 | Chicago Bulls vs Minnesota Timberwol | United Center (Basketball) | | 2 |
| 1/13/03 | Chicago Bulls vs New York Knicks | United Center (Basketball) | | 2 |
| 12/31/02 | Chicago Bulls vs Portland Trail Blazers | United Center (Basketball) | | 2 |
| 12/18/02 | Chicago Bulls vs Toronto Raptors | United Center (Basketball) | | 2 |
| 1/6/03 | Chicago Bulls vs Utah Jazz | United Center (Basketball) | 2 | |
| 12/22/02 | Kansas City Chiefs vs San Diego Charg | Arrowhead Stadium (Football) | 16 | 35 |
| 1/4/03 | Los Angeles Kings vs Dallas Stars | Staples Center (Hockey) | | 5 |
| 12/17/02 | Los Angeles Kings vs St Louis Blues | Staples Center (Hockey) | 5 | |
| 1/10/03 | Los Angeles Lakers vs Cleveland Cava | Staples Center (Basketball) | 8 | |
| 1/12/03 | Los Angeles Lakers vs Miami Heat | Staples Center (Basketball) | | 4 |
| 12/30/02 | Missouri Tigers vs Valparaiso Crusader | Hearnes Center (Basketball) | | 4 |
| 12/29/02 | New England Patriots vs Miami Dolph | Gillette Stadium (Football) | | |

*FIG. 39*

3.2 Current Events
  Automatically Generates

| | Event Report | | | |
|---|---|---|---|---|
| 1/15/2003 | | | | |
| Date | Event | Venue | Sold | Available |
| 3/21/03 | 10 Gates Dancing | National Arts Centre | | 3 |
| 3/20/03 | 10 Gates Dancing/Tedd Robinson | National Arts Centre | | 4 |
| 3/22/03 | 10 Gates Dancing/Tedd Robinson | National Arts Centre | 4 | 5 |
| 2/15/03 | 2003 AMA Supercross | HHH Metrodome | | 5 |
| 3/09/03 | 2003 AMA Supercross | Reliant Arena | | 8 |
| 1/23/03 | Chicago Blackhawks vs St Louis Blues | United Center (Hockey) | | 4 |

*FIG. 40*

4. Inventory
4.1 Sold Tickets Search Utility
Provide search criteria
Select event by highlighting the row

| | | | | | | |
|---|---|---|---|---|---|---|
| Event: | | | | Date: | | |
| Venue: | | | | Invoice #: | | |
| Section: | | Row: | | Item #: | | |
| Seat: | | | | Amount: | | |
| | | Search | Clear | | | |

Sold Inventory

| Invoice | EVENT | VENUE | Purch Date | Event Date | Section | Row | Seat |
|---|---|---|---|---|---|---|---|
| 88494 | NFL Pro Bowl | Aloha Stadium | 1/17/2001 | 2/4/2001 | C | 13 | 16 |
| 88914 | NFL Pro Bowl | Aloha Stadium | 1/26/2001 | 2/4/2001 | PP | 09 | 04 |
| 88914 | NFL Pro Bowl | Aloha Stadium | 1/26/2001 | 2/4/2001 | PP | 08 | 05 |
| 88926 | NFL Pro Bowl | Aloha Stadium | 1/26/2001 | 2/4/2001 | G | 31 | 03 |
| 88925 | NFL Pro Bowl | Aloha Stadium | 1/26/2001 | 2/4/2001 | G | 31 | 04 |

*FIG. 41*

BILL TO:

SHIP TO:

Invoice:          Customer No:

| Salesperson: | | | Date of Order: |
|---|---|---|---|
| Payment Method: | | | Date Order Shipped: |
| Credit Card: | | Exp: | Shipping: |
| Instructions: | | | |
| | | | Fed-Ex No: |

| Date | Time | Qty | Event | Venue | Section | Row | Seats | Price | Total |
|---|---|---|---|---|---|---|---|---|---|

Sub Total
Tax
Handling
Total Amount

*FIG.42*

4.2 Reserved Ticket List
Automatically generates report.

Reserved Tickets

| Event ID | Section | Row | Seat | | | Cost | List | Reserve |
|---|---|---|---|---|---|---|---|---|
| 101,677 | Boston Red Sox vs Anaheim Angels | | | Fenway Park | Monday, August 21, 2000 | | | |
| | 24 | EE | 1 | DUPLICATE | TICKETS | $0.00 | $155.00 | $155. |
| 103,706 | Boston Red Sox vs Seattle Mariners | | | Fenway Park | Saturday, September 2, 2000 | | | |
| | 11 | CC | 07 | DUPLICATE | TICKETS | $0.00 | $95.00 | $0. |
| | 11 | CC | 08 | DUPLICATE | TICKETS | $0.00 | $95.00 | $0. |
| 212,639 | Bruce Springsteen and the E Street Band | | | Dunkin Donuts Center (End Stage) | Monday, March 10, 2003 | | | |
| | 101# | C | 05 | KYLE | STONE | $82.65 | $0.00 | $0. |
| | 101# | C | 06 | KYLE | STONE | $82.65 | $0.00 | $0. |
| | 103* | EE | 01 | KYLE | STONE | $81.83 | $0.00 | $0. |
| | 103* | EE | 02 | KYLE | STONE | $81.83 | $0.00 | $0. |
| | 103* | EE | 03 | KYLE | STONE | $81.83 | $0.00 | $0. |
| | 103* | EE | 04 | KYLE | STONE | $81.82 | $0.00 | $0. |

FIG. 43

4.3 Expired Inventory
Automatically generates report

Expired Inventory

| College World Series - Session 5 (Rosenblatt Stadium) | | | Monday, June 17, 2002 | Count: | 2 |
|---|---|---|---|---|---|
| BB | Row | Seat | | Count | |
| | 10 | 03 | | 2 | |

| Minnesota Vikings vs New York Giants (HHH Metrodome (Ford)) | | | Sunday, November 10, 2002 | Count: | 30 |
|---|---|---|---|---|---|
| | Row | Seat | | Count | |
| 120 | 23 | 09 | | 2 | |

FIG. 44

4.4 PO Tickets
Automatically generates report

1/15/2003

| Event ID | Section | Row | Seat | | Cost | List | Sell |
|---|---|---|---|---|---|---|---|
| 1,712 2002 Mainstay Independence Bowl | | | | Independence Bowl Stadium | | Friday, December 27, 2002 | |
| Nebraska Cornhuskers vs Mississippi Rebels | | | | | | | |
| 113 | | II | 01 | | $35.00 | $0.00 | $175.0 |
| 113 | | II | 02 | | $35.00 | $0.00 | $175.0 |
| 113 | | II | 03 | | $35.00 | $0.00 | $150.0 |
| 113 | | II | 04 | | $35.00 | $0.00 | $150.0 |
| 113 | | II | 05 | | $35.00 | $0.00 | $150.0 |

FIG. 45

4.5 Sold Tickets
Automatically generates report

Sold Tickets Report

| Section | Row | Seat | Sold Date | Sold $$ | Res | Inv # |
|---|---|---|---|---|---|---|
| 2003 AMA Supercross | | | | | Saturday, February 15, 2003 | TBA |
| 133 | 05 | 15 | 1/13/03 | $95.00 | | 155,70 |
| 133 | 05 | 16 | 1/13/03 | $95.00 | | 155,70 |
| 2003 NFL Pro Bowl | | | Aloha Stadium | | Sunday, February 2, 2003 1:30 PM | |
| ORANGE K | 14 | 13 | 1/15/03 | $250.00 | | 155,8 |

4.6 Fax List
Provide search criteria.

| Event Picker | | | | |
|---|---|---|---|---|
| Headliner: | | Event: | | |
| Venue: | | Date: | | |
| Search  Print | ☐ Show Deleted  ☐ Show Expired | | | |
| Event | Venue | Event Date | Event Time |
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |

Select event by highlighting, Select multiple events by suppressing the Control or Shift keys while highlighting with mouse

FIG. 47

4.7 # Days Fax List
Prompt "How many days?"
Prompt "Include only shared tickets?"

4.8 Open Inventory
4.9 Open Inventory (Selected Events)
4.10 Open Inventory (Not Categorized)
   Automatically generates report

5. Registers
5.1 FedEx History

| Invoice | Comp. Date | Amount | Ship To | Payment | Shipping Type | Tracking # | Bill To |
|---|---|---|---|---|---|---|---|
| 155393 | 1/15/2003 | $3,135.00 | | Credit | FedEx Standard | 7201355400135 | Standard |
| 155417 | 1/15/2003 | $2,277.76 | | Credit | FedEx Standard | 790577847553 | Standard |
| 155328 | 1/15/2003 | $6,300.00 | | COD U- | FedEx Standard | 720277343006 | Recipient |
| 155521 | 1/15/2003 | $1,105.00 | | Credit | FedEx Standard | 790185633810 | Standard |
| 155458 | 1/15/2003 | $255.00 | | Credit | FedEx Priority | 791185488896 | Recipient |
| 155727 | 1/15/2003 | $3,115.00 | | Credit | FedEx Priority | 790185628980 | Standard |
| 155315 | 1/15/2003 | $215.00 | | Credit | FedEx Priority | 791277343777 | Recipient |
| 155417 | 1/15/2003 | $915.00 | | Credit | FedEx Standard | 791144444444 | Recipient |
| 155807 | 1/15/2003 | $1,740.00 | | Credit | FedEx Standard | 791277648446 | Standard |
| 155581 | 1/15/2003 | $135.00 | | Multiple | FedEx Standard | 791185760769 | Recipient |
| 155818 | 1/15/2003 | $500.00 | | AR | FedEx Standard | 790185534284 | Recipient |
| 155675 | 1/15/2003 | $6,500.00 | | COD U- | FedEx Standard | 791277509102 | Recipient |
| 155662 | 1/15/2003 | $905.00 | | Multiple | FedEx Standard | 790677813154 | Standard |
| 155330 | 1/15/2003 | $3,135.00 | | Credit | FedEx Standard | 7201355450C | Standard |
| 152329 | 1/15/2003 | $1,115.00 | | Credit | FedEx Standard | 791277433231 | Standard |
| 155100 | 1/15/2003 | $5,005.00 | | Credit | FedEx Standard | 7201355770C2 | Standard |
| 155829 | 1/15/2003 | $6,300.00 | | AR | FedEx Standard | 791277585069 | Standard |
| 155300 | 1/15/2003 | $515.00 | | Credit | FedEx Standard | 7201355400135 | Standard |
| 155736 | 1/15/2003 | $1,565.00 | | Credit | FedEx Priority | 790185623680 | Standard |
| 155518 | 1/15/2003 | $2,415.00 | | Credit | FedEx Standard | 791577770908 | Standard |

Delete | Track | Refresh | 01/15/03 | FedEx Report | Close

*FIG. 51*

5.2 Invoice Register

Able to modify search criteria. Select Refresh after modifying the search criteria. Select an item by highlighting the row. Select Print, this will generate an invoice.

| ID | Type | SalesRep | Event - Venue | Event Date | Qty | Seating | Sold For | Cost | Profit | Margin |
|---|---|---|---|---|---|---|---|---|---|---|
| 55B67 | COMPLETE | | Toronto Maple Leafs vs | 2/8/2003 | 3 | CAT A | $350.00 | | | |
| 55B67 | INVENTORY | | Toronto Maple Leafs vs | 2/8/2003 | 2 | 319 STD. ROW STD. | $120.00 | $82.10 | $37.90 | 32% |
| 55B67 | INVENTORY | | Toronto Maple Leafs vs | 2/8/2003 | 2 | 320 STD. ROW STD. | $240.00 | $164.20 | $75.80 | 32% |
| 55B66 | INVENTORY | | St Louis Blues vs Detroit | 3/22/2003 | 2 | 117. ROW A. SEATS | $500.00 | $220.00 | $280.00 | 56% |
| 55B65 | INVENTORY | | Guns N Roses - | 12/13/2002 | 2 | FL1. ROW 12. SEATS | $142.06 | $142.06 | $0.00 | |
| 55B63 | INVENTORY | | Guns N Roses - | 12/13/2002 | 2 | FL1. ROW 12. SEATS | $142.06 | $142.06 | $0.00 | 0% |
| 55B62 | INVENTORY | | Guns N Roses - | 12/13/2002 | 2 | FL2. ROW 09. SEATS | $142.06 | $142.05 | $0.01 | 0% |
| 55B61 | INVENTORY | | Guns N Roses - | 12/13/2002 | 2 | FL3. ROW 06. SEATS | $142.06 | $142.05 | $0.01 | 0% |
| 55B60 | PRICED | | Kansas Jayhawks vs | 1/25/2003 | 4 | CAT A | $2,400.00 | | | |
| 55B59 | PRICED | | UAW-Daimler Chrysler 400 | 3/2/2003 | 1 | CAT H | $175.00 | | | |
| 55B58 | INVENTORY | | Mamma Mia | 1/18/2003 | 2 | R OPC. ROW B. SEATS | $400.00 | $130.00 | $270.00 | 67% |
| 55B57 | INVENTORY | | Guns N Roses - | 12/13/2002 | 2 | FL3. ROW 03. SEATS | $142.06 | $142.05 | $0.01 | 0% |
| 55B56 | INVENTORY | | Guns N Roses - | 12/13/2002 | 2 | FL3. ROW 05. SEATS | $142.06 | $142.05 | $0.01 | 0% |
| 55B55 | INVENTORY | | 2003 NFL Pro Bowl | 2/2/2003 | 2 | BLUE H. ROW 45. | $370.00 | $200.00 | $170.00 | 46% |
| 55B54 | INVENTORY | | Super Bowl XXXVII | 1/26/2003 | 4 | CAT H | $6,600.00 | | | |
| 55B53 | INVENTORY | | George Strait | 2/13/2003 | 6 | 109. ROW M. SEATS | $900.00 | $417.40 | $482.60 | 54% |
| 55B52 | PRICED | | Belmont Stakes | 6/6/2003 | 2 | CAT B | $700.00 | | | |
| 55B51 | PRICED | | Cirque Du Soleil - O | 1/18/2003 | 2 | CAT A | $900.00 | | | |
| 55B51 | PRICED | | Danny Gans | 1/16/2003 | 3 | CAT A | $600.00 | | | |
| 55B50 | PRICED | | George Strait | 2/13/2003 | 5 | CAT C | $750.00 | | | |

Inventory Sales Total: $44,794  Profit: $12,175.00
Advanced Sales Total: $96,090

○ Sale Date  ○ Completion Date

FIG. 52

5.3 Purchase Order Register
Able to modify search criteria. Select Refresh after modifying the search criteria. Select an item by highlighting the row. Select Print, this will generate a Complete Purchase Order.

File  Purchases  Sales  Manage  Reports  Windows

Dates of PO's to Show:  12/17/02    [Refresh]   [Print (F4)]   [F9 to Sort]

| ID | Status | SalesRep | Payment Type | PO Total | Event - Venue | Event Date | Qty | Cost | Vendor |
|---|---|---|---|---|---|---|---|---|---|
| 41622 | Complete | | Credit Card | $179.55 | Yanni | 05/03/03 | 2 | $89.78 | TICKETMASTER |
| 41754 | Complete | | Credit Card | $162.50 | Shakira | 01/28/03 | 2 | $81.25 | TICKETMASTER |
| 41755 | Complete | | Credit Card | $162.50 | Shakira | 01/29/03 | 2 | $81.25 | TICKETMASTER |
| 41756 | Complete | | Credit Card | $205.00 | 2003 Nokia Super Bowl | 01/01/03 | 2 | $102.50 | TICKETMASTER |
| 41788 | Complete | | Credit Card | $205.00 | 2003 Nokia Super Bowl | 01/01/03 | 2 | $102.50 | TICKETMASTER |
| 41789 | Complete | | Credit Card | $205.00 | 2003 Nokia Super Bowl | 01/01/03 | 2 | $102.50 | TICKETMASTER |
| 41827 | Complete | | Credit Card | $355.75 | Cher | 03/13/03 | 4 | $88.94 | TICKETS.COM |
| 41865 | Complete | | Credit Card | $202.40 | Alan Jackson | 02/07/03 | 4 | $50.60 | TICKETMASTER |
| 41868 | Complete | | Credit Card | $102.70 | Alan Jackson | 02/07/03 | 2 | $51.35 | TICKETMASTER |

FIG. 53

5.4 Web Sales Register
Able to modify search criteria. Select Refresh after modifying the search criteria. Select an item by highlighting the row. Select Print, this will genrate a Priced Event Sale Report.

FIG. 54

5.6 Exchange Transactions

| | | | | | Broker Transactional Details | | | | | |
|---|---|---|---|---|---|---|---|---|---|---|
| Display: | All Transactions | ▼ | | | | | | | | |
| Date | Transaction | Via | Account ID | Event Date Time | Event Record | Qty (sent, recv) | List Price sold Price | Broker recvd | Broker paid | Transaction Source |
| 1/16/2003 1:34:32 PM | Tickets Sold to Customer | Web | 187932 | 4/1/2003 TBA | Jesus Christ Superstar (Fabulous Fox Theatre (GA)) | 2 (ORCH C R) | $85 $120 | 0 | 0 | EHS1542-ADV |

FIG. 55

6. Sales Reports
6.1 Daily Sales by Event
Select Date Range, Sorts by Event Name

*Event Sales*

2003 AMA Supercross (HHH Metrodome (Football)) Saturday, February 15, 2003 TBA

| Inv# | Sold | Rep | Customer | Location | Sold | Cost | Profit |
|---|---|---|---|---|---|---|---|
| 15700 | 1/13/03 | Amy Easton | CHARLES DUNLAP | Section: 123 Row: 05 Seats: 19 to 16 | 190.00 | 130.00 | 60.00 |
| | | | | | 190.00 | 130.00 | 60.00 |

2003 Fedex Orange Bowl - Iowa Hawkeyes vs USC Trojans (Pro Player Stadium (Football)) Thursday, January 2, 2003 8:00 PM

| Inv# | Sold | Rep | Customer | Location | Sold | Cost | Profit |
|---|---|---|---|---|---|---|---|
| 15187 | 1/2/03 | John | WRITE OFF | Section: 444 Row: 24 Seats: 20 to 20 | 0.00 | 50.00 | (50.00) |
| 15187 | 1/2/03 | John | WRITE OFF | Section: PKG Row: ORANGE Seats: 170 to 171 | 0.00 | 0.00 | 0.00 |
| 15187 | 1/2/03 | Jake | WRITE OFF | Section: TAILGATE Row: PARTY Seats: 747 to | 0.00 | 0.00 | 0.00 |
| | | | | | 0.00 | 50.00 | (50.00) |

2003 Rose Bowl - Oklahoma Sooners vs Washington State Cougars (Rose Bowl) Wednesday, January 1, 2003 2:00 PM

| Inv# | Sold | Rep | Customer | Location | Sold | Cost | Profit |
|---|---|---|---|---|---|---|---|
| 15173 | 1/1/03 | Tim | GERARDO ESQUIVEL | Section: 07 Row: 19 Seats: 01 to 02 | 150.00 | 50.00 | 100.00 |
| | | | | | 150.00 | 50.00 | 100.00 |

Yanni (Gaylord Entertainment (End Stage)) Wednesday, March 12, 2003 7:30 PM

| Inv# | Sold | Rep | Customer | Location | Sold | Cost | Profit |
|---|---|---|---|---|---|---|---|
| 15106 | 1/1/03 | | | Section: 02 Row: A Seats: 07 to 08 | 420.00 | 300.00 | 120.00 |
| | | | | | 420.00 | 300.00 | 120.00 |

Report Totals: 1,002 | 283,751.97 | 210,357.63 | 72,394.34

→ total Sold, Cost, Profit per Event
→ total tickets per event
→ total Sold, Cost, Profit for date range
→ total tickets for date range

*FIG. 56*

6.2 Daily Sales by Payment Type
Select Date Range, Sorts by Payment Type 6.4 Daily Purchases by Payment Type
Select Date Range

| PO ID | PO Date | | Amount | First Name | Last Name | Company |
|---|---|---|---|---|---|---|
| Account Payable | | | | | | |
| 43,480 | 1/13/2003 | 12:13:04PM | 1,050.00 | | | ENCORE TICKETS-T |
| 43,594 | 1/13/2003 | 10:35:02AM | 250.00 | | | CONCERT CONNECTI |
| 43,596 | 1/13/2003 | 11:17:34AM | 375.00 | | | CITY TICKETS |
| 43,599 | 1/13/2003 | 11:47:31AM | 330.00 | | | TIMES SQUARE ENT |
| 43,600 | 1/13/2003 | 11:40:59AM | 170.00 | | | TICKET WAREHOUS |
| 43,604 | 1/13/2003 | 1:11:59PM | 130.00 | | | TICKET KING II |
| 43,607 | 1/13/2003 | 1:44:23PM | 400.00 | | | |
| 43,608 | 1/13/2003 | 1:51:56PM | 225.00 | | | FRONT ROW ENTERT |
| 43,612 | 1/13/2003 | 1:59:02PM | 3,800.00 | | | BARRYS TICKET SE |
| 43,614 | 1/13/2003 | 2:26:45PM | 250.00 | | | |
| 43,619 | 1/13/2003 | 3:39:23PM | 2,700.00 | | | GAME DAY ENTERT |
| 43,621 | 1/13/2003 | 4:40:51PM | 2,700.00 | | | |

| PO ID | PO Date | | Amount | First Name | Last Name | Company |
|---|---|---|---|---|---|---|
| 43,624 | 1/13/2003 | 6:03:38PM | 550.00 | | | |
| | | | *106,200.00* | | | |
| | | | 144,737.80 | | | | end of report total

*FIG. 59*

6.6 Chicago Sales Tax Viewer

FIG. 61

6.7 Chicago Sales Tax Report
Select Date Range
Prompt "Show sales you charged $0.00 for?", select yes or no
Prompt "Do you charge tax on handling?", select yes or no
Prompt "Do you charge tax on shipping?", select yes or no

| *Theatre* | Qty | Total Price | Face | Taxable | Should be Taxed | Amt Taxed for entire sale | Shipping | Handling |
|---|---|---|---|---|---|---|---|---|
| Web | | | | | | | | |
| 155,667 | 2 | 420.00 | 0.00 | 435.00 | $13.05 | 0.00 | 15.00 | 0.00 0?? |
| | | | | | | $0.00 | | |
| | | | | | | $0.00 | | |

*FIG. 62*

6.8 Purchases for an Event
Provide search criteria

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |

*FIG. 63*

| Event | Venue | Event Date | Event Time |
|---|---|---|---|
| AFC Conference Championship - Oakland | Network Associates | Sunday, 01/19/03 | 3:30 PM |
| Super Bowl Package | | | |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency (San | Thursday, 01/23/03 | 3:00 PM |
| Super Bowl XXXVII | Qualcomm Stadium | Sunday, 01/26/03 | 3:00 PM |

Select event by highlighting, Select Multiple events by suppressing the Control or Shift keys while highlighting with mouse.

*FIG. 64*

Click the Print button to generate the report

Purchase Orders by Event

| | | Cost | List | Sold For | |
|---|---|---|---|---|---|

NFC Conference Championship - Philadelphia Eagles vs Tampa Bay Buccaneers (Veterans Stadium (Football)) Sunday, January 19, 2003 @ 3:00 PM (200.00 Profit: ($2,350.00))
Tickets: 11  Sold Tickets: 2

Purchase Order # 43383                     PO Date: 1/8/03  Payment: Check  Confirm: $350 paid 1/8, owe $500 if eagles
Tickets: 2
Profit: $350.00

| | | | | | |
|---|---|---|---|---|---|
| 304 | 01 | $250.00 | $425.00 | $425.00 | Sold  In Hand |
| 304 | 02 | $250.00 | $425.00 | $425.00 | Sold  In Hand |
| | 03 | $500.00 | $850.00 | $850.00 | |

Purchase Order # 43591                     PO Date: 1/13/03  Payment: Ticket Deposit  Confirm: BRENT
Tickets: 2
Profit: ($700.00)

| | | | | | |
|---|---|---|---|---|---|
| 364 | 05 | $350.00 | $650.00 | $0.00 | In Hand |
| 364 | 06 | $350.00 | $650.00 | $0.00 | In Hand |
| | | $700.00 | $1,300.00 | $0.00 | |

FIG. 65

6.9 Event Sales
Provide search criteria.

Event Picker

Headliner: [NFL Post Season (NFL)]

Venue:

[Search]  [Print]

Event: 
Date: 
☐ Show Deleted  ☐ Show Expired

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency (San | Thursday, 01/23/03 | 3:00 PM |
| Super Bowl XXXVII | Qualcomm Stadium | Sunday, 01/26/03 | 3:00 PM |
| Super Bowl Package extra night | Qualcomm Stadium | Monday, 01/27/03 | TBA |
| Super Bowl XXXVIII | Reliant Stadium (Football) | Sunday, 02/01/04 | TBA |
| Super Bowl XL | Ford Field | Sunday, 02/05/06 | TBA |

Select event by highlighting. Select multiple events by suppressing the Control or Shift keys while highlighting with mouse.

FIG. 66

Click the Print button to generate the report

Event Sales

Super Bowl XXXVII (Qualcomm Stadium (Football)) Sunday, January 26, 2003 3:00 PM

| Inv# | Sold | Rep | Customer | Location | Sold | Cost | Profit |
|---|---|---|---|---|---|---|---|
| 153860 | 12/13/02 | | | Section: FIELD 20 Row: 20 Seats: 13 to 14 | 3,900.00 | 2,700.00 | 1,200.0 |
| 155735 | 1/13/03 | | | Section: CLUB 13 Row: 01 Seats: 11 to 13 | 5,850.00 | 4,200.00 | 1,650.0 |
| 155710 | 1/14/03 | | | Section: FIELD 08 Row: 23 Seats: 07 to 13 | 27,900.00 | 21,150.00 | 6,750.0 |
| 155659 | 1/13/03 | | | Section: CLUB 03 Row: 01 Seats: 14 to 15 | 5,900.00 | 4,300.00 | 1,600.0 |
| 155707 | 1/13/03 | | | Section: PLAZA 12 Row: 07 Seats: 01 to 02 | 4,100.00 | 3,800.00 | 300.0 |
| 155718 | 1/13/03 | | | Section: CLUB 03 Row: 01 Seats: 16 to 17 | 5,900.00 | 4,300.00 | 1,600.0 |
| 155665 | 1/13/03 | | | Section: CLUB 03 Row: 03 Seats: 08 to 17 | 29,500.00 | 21,500.00 | 8,000.0 |
| 155725 | 1/13/03 | | | Section: VIEW 56 Row: 13 Seats: 05 to 10 | 8,700.00 | 7,200.00 | 1,500.0 |
| 155725 | 1/13/03 | | | Section: VIEW 56 Row: 13 Seats: 17 to 20 | 5,800.00 | 4,800.00 | 1,000.0 |
| | | | | | 40 | 97,550.00 | 73,950.00 | 23,600.00 |
| | | | Report Totals: | | 40 | 97,550.00 | 73,950.00 | 23,600.00 |

*FIG. 67*

6.10 Event Sales Timeline (Weekly)
6.11 Event Sales Timeline (Daily)

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency (San | Thursday, 01/23/03 | 3:00 PM |
| Super Bowl XXXVII | Qualcomm Stadium | Sunday, 01/26/03 | 3:00 PM |
| Super Bowl Package extra night | Qualcomm Stadium | Monday, 01/27/03 | TBA |
| Super Bowl XXXVIII | Reliant Stadium (Football) | Sunday, 02/01/04 | TBA |
| Super Bowl XL | Ford Field | Sunday, 02/05/06 | TBA |

Headliner: [NFL Past Season (NFL)]  Event:
Venue:  Date:
[Search] [Print]   ☐ Show Deleted  ☐ Show Expired Provide Search criteria.

Select event by highlighting, Select Multiple events by suppressing the Control or Shift keys while highlighting with mouse.

FIG. 68

Select the Print button to generate the report

Weekly Sales by Category

Event ID: 110,289　　Super Bowl XXXVII　　　　　　　　　　Sunday, January 26, 2003
　　　　　　　　　　Qualcomm Stadium (Football)　　　　　　　3:00 PM Week 3　Monday, January 13, 2003

| | | Qty | Avg. Prt. | Avg. Cost | Profit |
|---|---|---|---|---|---|
| Lower Level Goal to 30 Yard Line | B | 27 | $2,985.19 | $2,231.48 | $20,350.00 |
| Lower Level Corner Endzone | C | 16 | $1,901.56 | $1,525.00 | $6,025.00 |
| Lower Level Endzone | D | 8 | $1,806.25 | $1,176.25 | $5,040.00 |
| Upper Level Endzone | H | 10 | $1,450.00 | $1,200.00 | $2,500.00 |
| | | 61 | $139,975.00 | $106,060.00 | $33,915.00 |

6.12 Event Purchases Timeline (Weekly)

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Thursday, 01/23/03 | TBA |
| Hyatt Regency Rooms 1/23 - 1/27 | Hyatt Regency (San | Thursday, 01/23/03 | 3:00 PM |
| Super Bowl XXXVII | Qualcomm Stadium | Sunday, 01/26/03 | 3:00 PM |
| Super Bowl Package extra night | Qualcomm Stadium | Monday, 01/27/03 | TBA |
| Super Bowl XXXVIII | Reliant Stadium (Football) | Sunday, 02/01/04 | TBA |
| Super Bowl XL | Ford Field | Sunday, 02/05/06 | TBA |

Provide Search criteria.

Select event by highlighting, Select Multiple events by suppressing the Control or Shift keys while highlighting with mouse.

FIG. 70

Select the Print button to generate the report.

Event ID: 110,289  Super Bowl XXXVII  Sunday, January 26, 2003
Qualcomm Stadium (Football)  3:00 PM Week 2  Friday, January 10, 2003

| | | Qty | Avg. Prt | Avg. Cost |
|---|---|---|---|---|
| Lower Level Corner Endzone | C | 2 | $1,775.00 | $1,350.00 |
| Upper Level Corner Endzone | G | 4 | $0.00 | $1,250.00 |

Week 3  Monday, January 13, 2003

| | | Qty | Avg. Prt | Avg. Cost |
|---|---|---|---|---|
| Lower Level 25 to 50 Yard Line | A | 9 | $0.00 | $3,138.89 |
| Lower Level Goal to 20 Yard Line | B | 28 | $2,878.57 | $2,201.79 |
| Lower Level Corner Endzone | C | 26 | $1,304.81 | $1,448.08 |
| Lower Level Endzone | D | 12 | $1,204.17 | $1,217.50 |
| Upper Level Corner Endzone | G | 2 | $0.00 | $1,250.00 |
| Upper Level Endzone | H | 10 | $1,450.00 | $1,200.00 |

Grand Totals for Event

| | | Qty | Avg. Prt | Avg. Cost |
|---|---|---|---|---|
| Lower Level 25 to 50 Yard Line | A | 9 | $0.00 | $3,138.89 |
| Lower Level Goal to 20 Yard Line | B | 28 | $2,878.57 | $2,201.79 |
| Lower Level Corner Endzone | C | 28 | $1,338.39 | $1,441.07 |
| Lower Level Endzone | D | 12 | $1,204.17 | $1,217.50 |
| Upper Level Corner Endzone | G | 6 | $0.00 | $1,250.00 |
| Upper Level Endzone | H | 10 | $1,450.00 | $1,200.00 |

FIG. 71

6.13.2 Selected Event

| Event | Venue | Event Date | Event Time |
|---|---|---|---|
| AFC Conference Championship - Oakland | Network Associates | Sunday, 01/19/03 | 3:30 PM |
| NFC Conference Championship - | Veterans Stadium | Sunday, 01/19/03 | 3:00 PM |
| Super Bowl Package | Qualcomm Stadium | Thursday, 01/23/03 | TBA |
| Championship Package 1/23/03 - | Gaslamp Plaza Suites | Thursday, 01/23/03 | TBA |
| Field Goal Package 1/23/03 - 1/27/03 | Hampton Inn | Thursday, 01/23/03 | TBA |
| Touchdown Package 1/23/03 - 1/27/03 | Double Tree Club | Thursday, 01/23/03 | TBA |
| Safety Package 1/23/03 - 1/27/03 | Ramada Inn South | Sunday, 01/26/03 | 3:00 PM |
| Hyatt Regency Rooms 1/23 - 1/27 | Hyatt Regency (San | Monday, 01/27/03 | 3:00 PM |
| Super Bowl XXXVII | Qualcomm Stadium | Sunday, 02/01/03 | TBA |
| Super Bowl Package extra night | | | |
| Super Bowl XXXVIII | Reliant Stadium (Football) | | |
| Super Bowl XL | Ford Field | Sunday, 02/05/06 | TBA |

Provide Search criteria.

*FIG. 73*

Select event by highlighting. Select Multiple events by suppressing the Control of Shift keys while highlighting with mouse.

6.14 Daily Totals
   Automatically Generates
   *Report is date inclusive in descending order

Daily Sales Report

| Date | Sell Price | Cost | Profit |
|---|---|---|---|
| Tuesday, January 14, 2003 | 90,965.00 | 67,968.00 | 22,997.00 |
| Monday, January 13, 2003 | 75,860.00 | 52,184.41 | 23,675.59 |
| Friday, January 10, 2003 | 22,105.00 | 14,834.58 | 7,270.42 |
| Thursday, January 9, 2003 | 29,343.25 | 18,987.22 | 10,356.03 |
| Wednesday, January 8, 2003 | 18,675.00 | 11,012.57 | 7,662.43 |
| Tuesday, January 7, 2003 | 27,690.00 | 18,040.32 | 9,649.68 |
| Monday, January 6, 2003 | 30,317.50 | 27,292.91 | 3,024.60 |
| Saturday, January 4, 2003 | 2,015.00 | 1,390.00 | 625.00 |

METHODS AND COMPUTER-READABLE STORAGE DEVICES FOR MANAGING TRANSACTIONS WITH MULTIPLE BROKER AFFILIATES

BACKGROUND OF THE INVENTION

1. Field of the Invention

The present invention relates generally to automated transaction management, and in particular to a system and method for managing e-commerce transactions using an Internet (world wide web) based distributed network with a central exchange server networked to multiple broker computers.

2. Discussion of the Related Art

Various systems and methodologies have previously been developed for managing commercial transactions involving buyers, sellers, brokers, agents and other participants. The objects of the transactions can comprise goods and/or services.

The Internet (world wide web) has produced many opportunities for transacting business quickly and efficiently, as compared to more traditional business transaction methods. Transacting business via the Internet is sometimes referred to as "electronic commerce" or "e-commerce". Among its many advantages is the ability to provide virtually instantaneous, i.e. "real-time", communication among the participants. Orders can be instantly taken and processed online from Internet-linked terminals located all over the world.

The instantaneous, real-time aspect of e-commerce particularly lends itself to date-sensitive transactions, i.e. those presenting relatively limited opportunities for concluding transactions. For example, tickets to date-specific events and for date-specific services generally become worthless after expiration. Sporting and entertainment events are typically booked months in advance and tickets are presold through various distribution trade channels and ticket outlets, including e-commerce. The sports and entertainment industries allocate considerable resources to matching ticket demand and supply in order to maximize event attendance and revenue. Although large portions of available seats are presold months in advance, tickets are often in high demand up to the last minute. Therefore, an efficient distribution model for tickets to date-specific events and services would match sellers holding tickets with buyers in the largest possible customer base, and provide instantaneous, real-time access to such information.

Ticket brokers operating in many areas buy and sell tickets to various sports and entertainment events. Although the markets tend to be somewhat localized to particular venues, transactions are routinely done on a national or even international basis. For example, through their web pages ticket brokers may encounter opportunities to purchase tickets from sellers and sell tickets to buyers in global markets. Moreover, ticket distribution lends itself to broker-to-broker ("B2B") transactions as different brokers trade amongst themselves in order to fulfill specific customer requests. However, automating ticket transactions among brokers with different inventories and marketing objectives can involve handling large amounts of data. A need therefore exists for automating the management of e-commerce transactions involving tickets and other goods and services.

Heretofore there has not been available a transaction management system and method with the advantages and features of the present invention.

BRIEF DESCRIPTION OF THE INVENTION

In the practice of one aspect of the present invention, a system is provided for managing commercial transactions. The system includes a distributed network comprising a central exchange computer linked to multiple customer/vendor computer systems. Transaction objects comprising goods and/or services can be bought and sold using various flexible, redefinable rules governing various aspects of the transactions. The system is adapted to interface with other automated business systems, including shipping and bookkeeping.

BRIEF DESCRIPTION OF THE DRAWINGS

The drawings constitute a part of this specification and include exemplary embodiments of the present invention and illustrate various objects and features thereof.

FIG. 2 is a block diagram of the distributed network, showing components thereof.

FIG. 3 is a table showing broker transaction rules.

FIG. 6 is a block diagram showing components of the system.

FIGS. 7-9 are screen displays from a special order system (SOS) showing examples of functions.

FIG. 10 is a flowchart of a point-of-sale (POS) system transaction.

DETAILED DESCRIPTION OF THE INVENTION

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
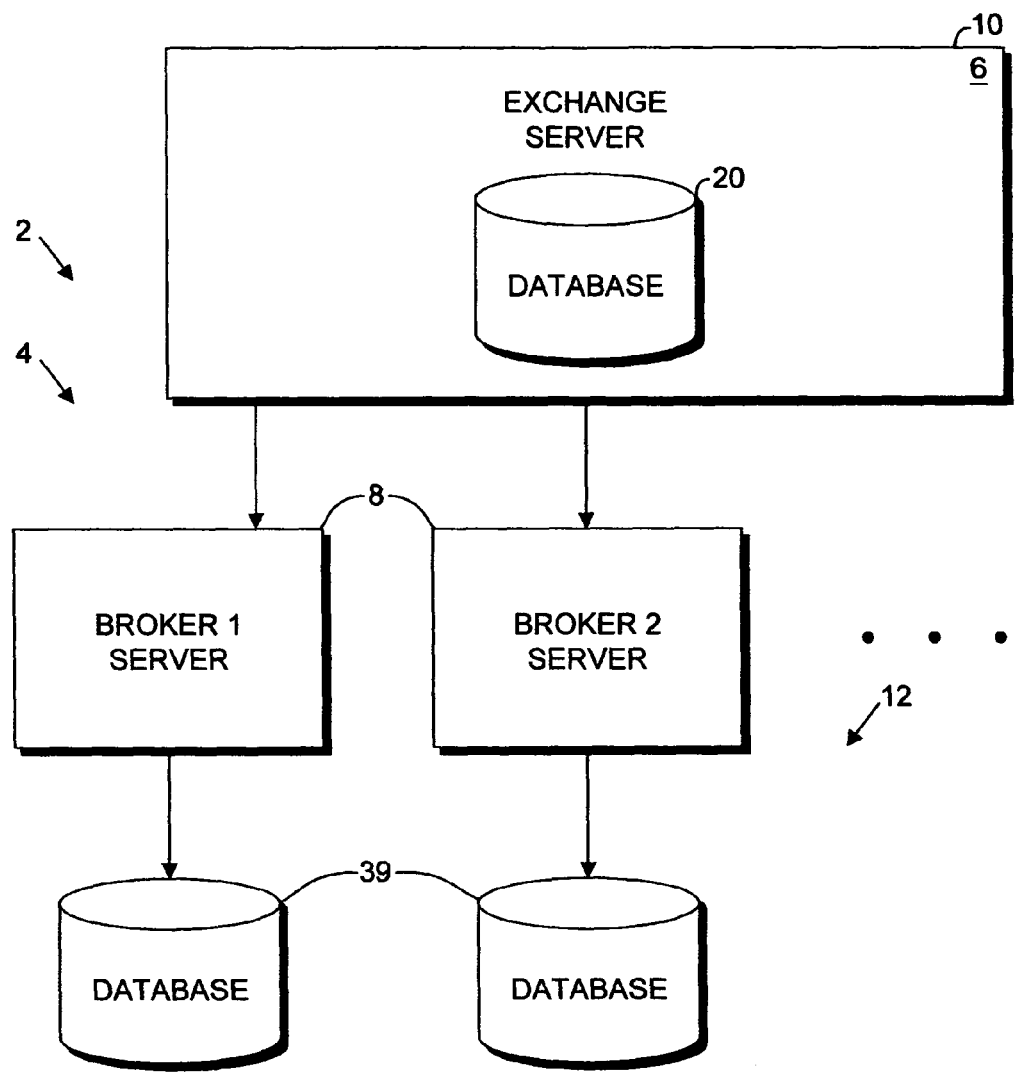
FIG. 1 is a block diagram showing a distributed network embodying one aspect of the system of the present invention.

Referring to the drawings in more detail, the reference numeral 2 generally designates a system for managing e-commerce transactions utilizing a distributed network 4 with a central exchange computer system 6 and multiple remote computer systems 8 (FIG. 1). Without limitation on the generality of useful applications of the system 2, an exemplary aspect or application thereof is described in connection with transactions involving tickets to events, such as sporting events, entertainment and theater. The distribution system for such merchandise includes a central administrator 10 associated with the central exchange computer 6 and a network of point-of-sale (POS) ticket brokers, affiliates or dealers 12 associated with respective remote computers 8. The ticket brokers 12 typically buy from and sell to their respective customers, who can comprise individual end users 14. The customers can also comprise other brokers 12 in connection with broker-to-broker (B2B) transactions.

FIG. 2 shows the central exchange system 6 with a message server 16 connected to an SQL server 18, which accesses an exchange database 20. An exchange web service 22 connects the message server 16 to a web server 24. The components of the system 2 can be programmed with a number of different programming languages using various suitable programming techniques including, but not limited to, variations of C (e.g., C++, C#, etc.).

A web side 26 includes a web page 28 for direct interaction with other brokers 12 and with end users 14. A broker side 30 includes point-of-sale (POS) software 32 adapted for managing broker operations. The brokers 12 can interface with the central exchange system 6 through broker client applications 34, which can, also be programmed with a number of different programming languages using various suitable programming techniques including, but not limited to, Visual Basic (VB). The brokers' POS software can comprise different levels of features and functionalities, such as the SQL server 36 with a full range of features and functionalities, and a MySQL server 38 for a reduced-feature application. The broker-controlled servers 36, 38 can access data in respective local databases 40 whereby the broker subscribers control their perspective data in their own databases 39, which are connected to respective remote computers 8 and can be physically located at the brokers' respective places of business. The brokers' computers 8 are adapted for downloading ticket information from and uploading or "pushing up" ticket information to the central exchange system 6 according to predetermined rules, at least some of which are controlled by the brokers 12, as described in more detail below.

Transactions and and

Without limitation on the generality of useful applications of the invention, an exemplary set of transactions, which can be managed by the system 2, is described as follows:

a) Buying and selling tickets directly to the central exchange system 6.

b) Posting tickets to the exchange 6 in either real-time (RT) corresponding to the tickets actually possessed (i.e., in inventory) by the broker 12, or in non real-time (NRT) representing orders for tickets to be fulfilled using the system's resources.

c) Adding customers, which can comprise either end-user customers 14 or other brokers 12, to the exchange database 20.

d) Reserving tickets.

e) Buying tickets.

f) Selling tickets.

g) Buying tickets and reselling to customers (single transaction).

h) Obtaining customer information.

i) Unreserving tickets.

j) Verifying ticket existence.

k) Updating exchange application through message server 16.

l) Remote debugging through the SQL 18.

m) Checking status of pending orders.

n) Obtaining remote order listing.

o) Generic exchange, i.e. getting invoice data, purchase order data and/or billing data including markups, without building a customer record.

p) Getting global updates and of events including downloading latest event lists from the central exchange server 6 and pushing up event lists from brokers 12 for comparison with current lists and updating same, if necessary.

Ticket Grouping

The ticket grouping function forms groups of tickets by internally matching certain criteria, such as event, date, time, section, row, face value and price. For example, when the queue record indicates that tickets are to be added to the exchange, the broker's local database 20 is searched for internal matches whereby groups are created. Customers requesting certain blocks of adjacent or contiguous seats at specific events can thus be accommodated. Moreover, the system forms such groups based on price whereby all of the tickets within particular groups have common pricing. Pricing can be considered in connection with face value, customer list price (corresponding to broker selling price) and broker wholesale price. Moreover, certain entities, such as the city of Chicago, impose sales tax on ticket sales, which is calculated by the system 2 and added to the ticket selling price. Moreover, certain states restrict prices for reselling tickets, which restrictions can be accommodated by the system 2 in connection with ticket pricing.

The ticket grouping function can increase system efficiency and transaction speed in connection with posting tickets. In particular, groups of tickets comprise less data than the same tickets handled individually, whereby less data is pushed back and forth and greater speed is realized when the grouping function is utilized for posting tickets.

Priced Events

Priced event transactions involve non real time (NRT) ticket inventory whereby brokers 12 can offer for sale tickets that they don't actually possess. Priced event tickets can be ordered by customers 14 in real-time (RT) transactions. The brokers 12 then procure the necessary presold, priced event tickets by using the resources of the system 2, or by procuring them from their own sources. Real-time (RT) inventories, by contrast, comprise tickets actually possessed by the brokers 12.

Priced event sales occur in real-time when customers place orders for specific numbers of tickets to specific events. The system generally accommodates selecting seating areas in priced events. For example, seats are commonly located by section, row and seat number in many venues, with ticket pricing corresponding to seat locations. Thus, priced event customers can order tickets online with a particular broker 12 or with the central exchange 6. The orders can specify the seating areas. The central database 20 is then searched by the system and the orders are filled as tickets become available. The central exchange 6 provides seating section information for venues. For example, broker affiliates 12 can access graphical displays of seating in particular venues, with seating sections designated alphanumerically or in colors to assist in ticket selection for priced events and real-time purchases. For example, the information in a priced event order can comprise an identification of the event, the desired seating sections (e.g., by letter or color designation), ticket quantity and ticket price.

The priced event function of the present invention facilitates sharing inventory by the broker affiliates 12 to the exchange 6, thus broadening the potential customer base system-wide. However, the broker affiliate 12 relinquishes tickets from its own inventory, thus possibly losing the opportunity for direct sales. The system accommodates the broker affiliates by enabling them to set certain rules for offering and selling their tickets on the exchange. These rules are listed in FIG. 3, and generally provide control over such variables as the web sites on which particular ticket groups are shown, showing ticket groups on the exchange, which brokers' tickets are shown on other brokers' web sites, pricing markups and quantity, event and other variable restrictions.

Other System Components

Figure 4:
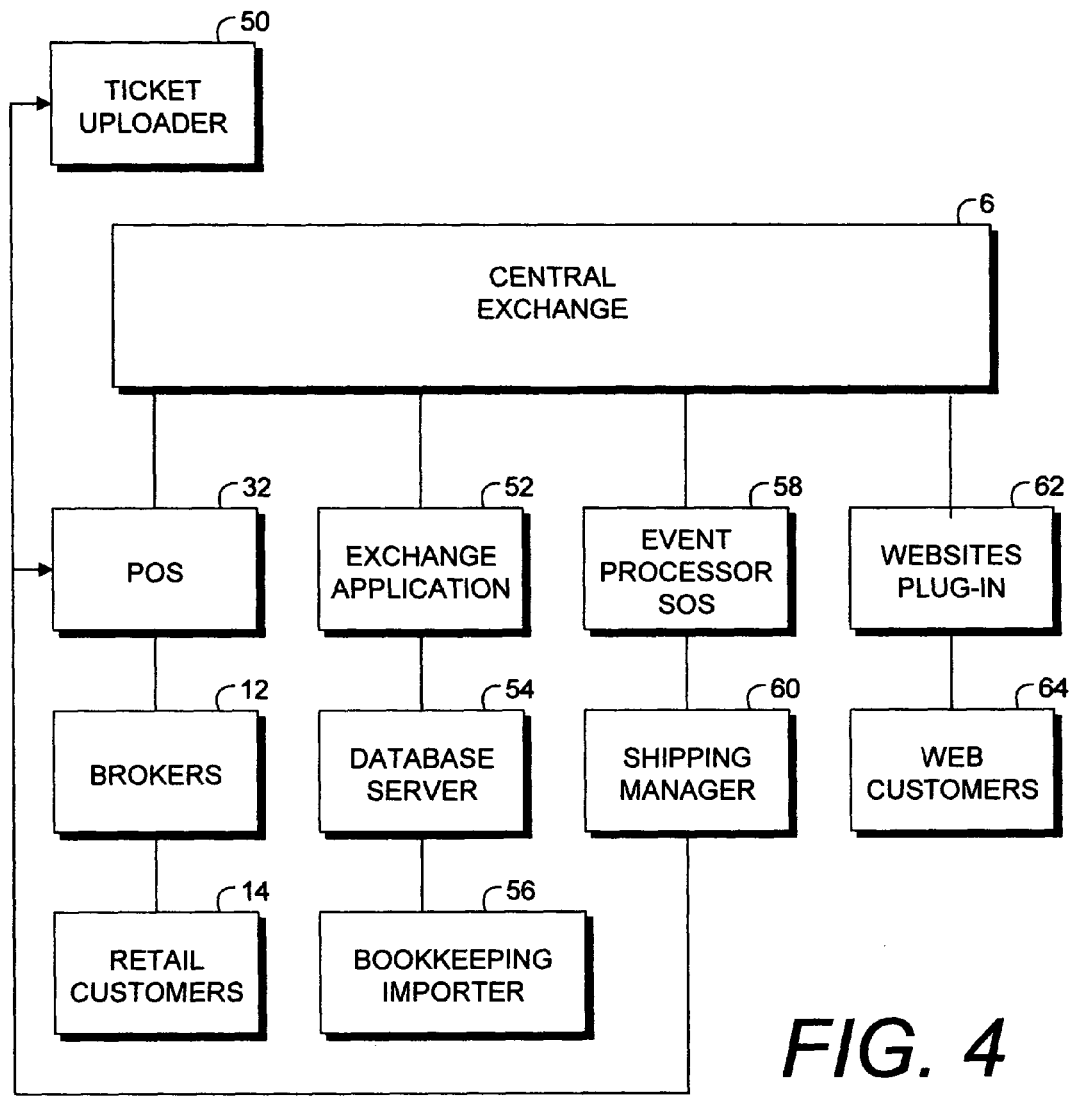
FIG. 4 is a flowchart showing the steps in a typical transaction.

FIG. 4 shows the central exchange 6 in relation to other components of the system 2. The POS 32 is described in more detail below and generally manages transactions for the brokers 12, who interface with customers 14. An exchange application 52 connects to a database server 54, which in turn connects to a bookkeeping importer 56. The system can be adapted to interface with bookkeeping systems, including but not limited to QuickBooks software available from Intuit, Inc. of Mountain View, Calif. 94039. The bookkeeping importer 56 provides for automated record insertion for financial accounting software. Other suitable bookkeeping software can be used with the system 2.

An event processor or special order system (SOS) 58 consists of a web-based bulletin board through which ticket inventories can be uploaded and is described in more detail below. The system further provides general exchange management, web site content management and shipping management. For example, a shipping manager system 60 can interface with various third party shipping service providers, such as overnight mail and courier services. The shipping manager system can ship, track and delete packages; print labels; provide customer information; generate various logs and reports; and print airbills. The central exchange system 6 provides RT and office-to-office order processing services.

A ticket uploader 50 is provided for uploading ticket inventories from other point-of-sale (POS) systems. Therefore, a broker utilizing another POS system can participate in the distributed network 4 of the present invention. The participating broker installs a ticket uploader (TU) program and sets certain variables, such as the timing of automatic uploading at predetermined intervals. Alternatively, ticket inventories can be uploaded manually. The tickets uploaded from these other sources are automatically placed on the network. Therefore, an extensive inventory of tickets placed on the web can be placed on the central exchange 6 for distribution by the brokers 12. Software in the central exchange 6 is adapted for interfacing with other vending and distribution systems, such as online auctions. Thus, brokers can push up their inventories for sale through online, live auctions. The broker can control various aspects of auction participation, such as providing templates and managing content. Moreover, the central exchange 6 takes tickets off the exchange while they are involved in online auctions and returns them to the central exchange inventory after the auctions close, all under the direction of the participating broker 12, which can set rules for such transactions.

Figure 5:
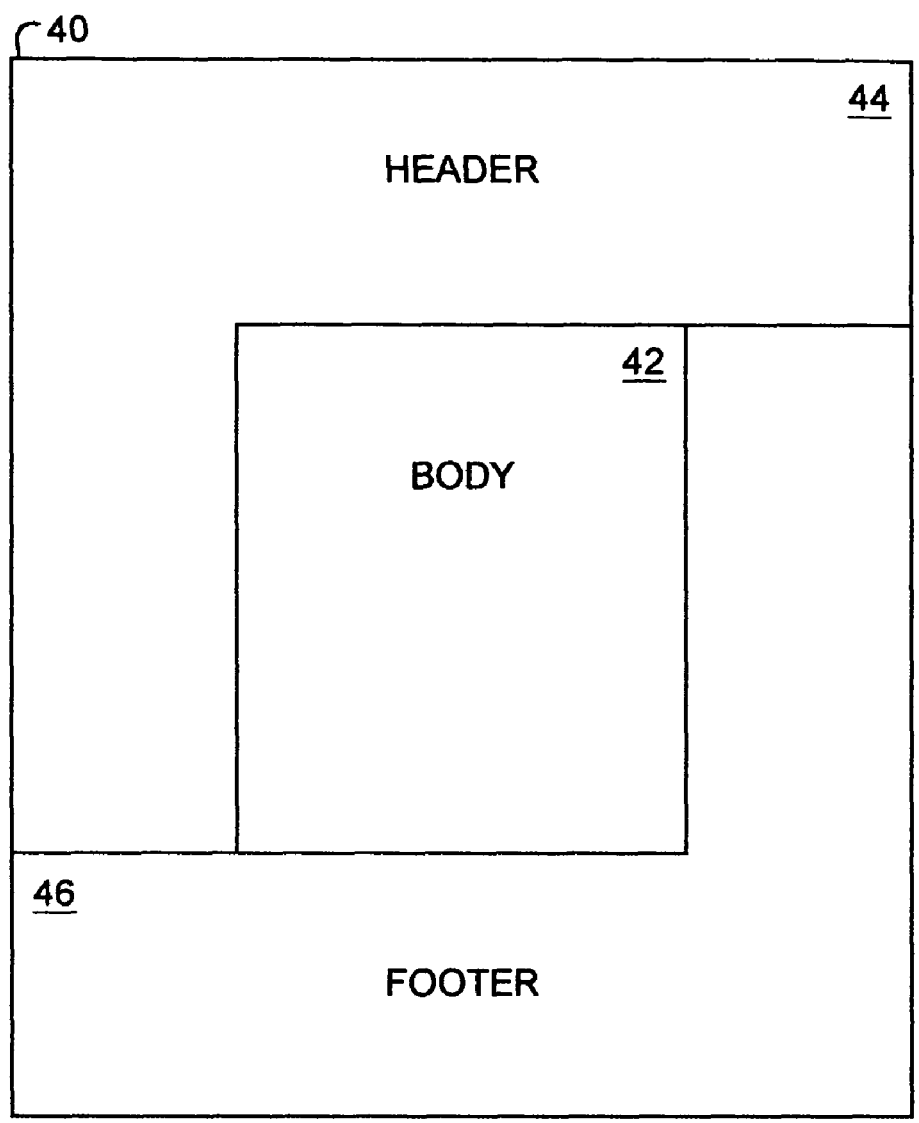
FIG. 5 is a diagram of a broker web page.

A website plug-in component 62 is available for the use of web customers 64 in creating their own websites for e-commerce utilizing the exchange network and the distributed network. A web page template 40 is shown in FIG. 5 and includes a body 42, which can display a default body provided by the system 2, or can be customized by the broker 12. A header 44 and a footer 46 are also provided and are adapted for customizing by a particular broker 12 or web customers 64. As shown in FIG. 5, the header 44 and the footer 46 wrap the body 42 and show on all pages of the web site. Examples of features available for customization by the brokers include plug-in fonts, sizes, colors, etc. Brokers 12 are thus able to graphically individualize their web sites for promoting their respective businesses and for distinguishing them from other web sites. The body 42 typically includes a search page, search results, ASP events page and category lists. The HTML information is stored in the system database.

Special Order System (POS)

FIGS. 6-9 show special order system (SOS) components and functionalities. FIG. 6 shows the screen displays for searching SOS events and providing ticket information, including "fake" tickets as described above. FIG. 7 is an SOS screen display showing possible ticket splits based on rules governing sales from packages of tickets. FIG. 8 shows broker settings, including markups. FIG. 9 shows web settings.

Point-of-Sale (POS)

Figure 11:
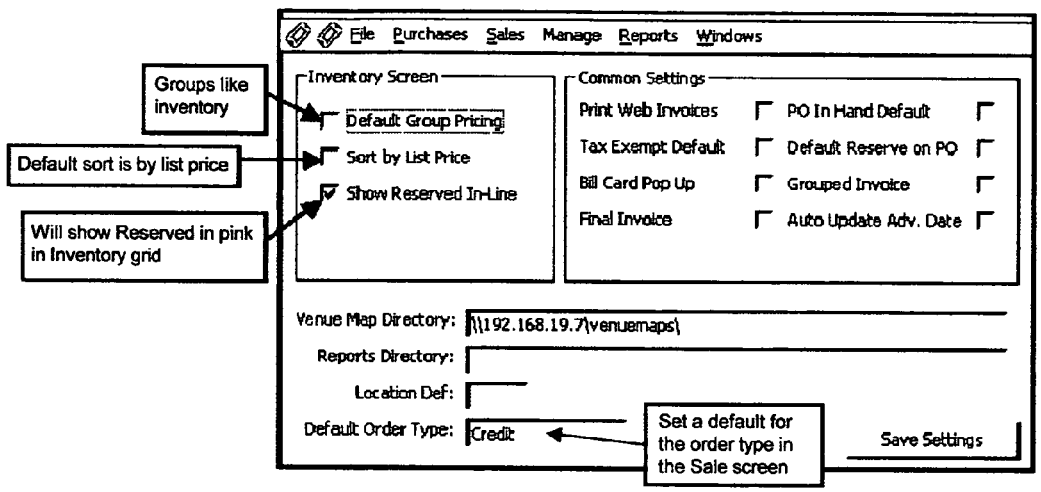
FIGS. 11-76 are screen displays from the point-of-sale (POS) system for use by a broker affiliated with the system.
Figure 12:
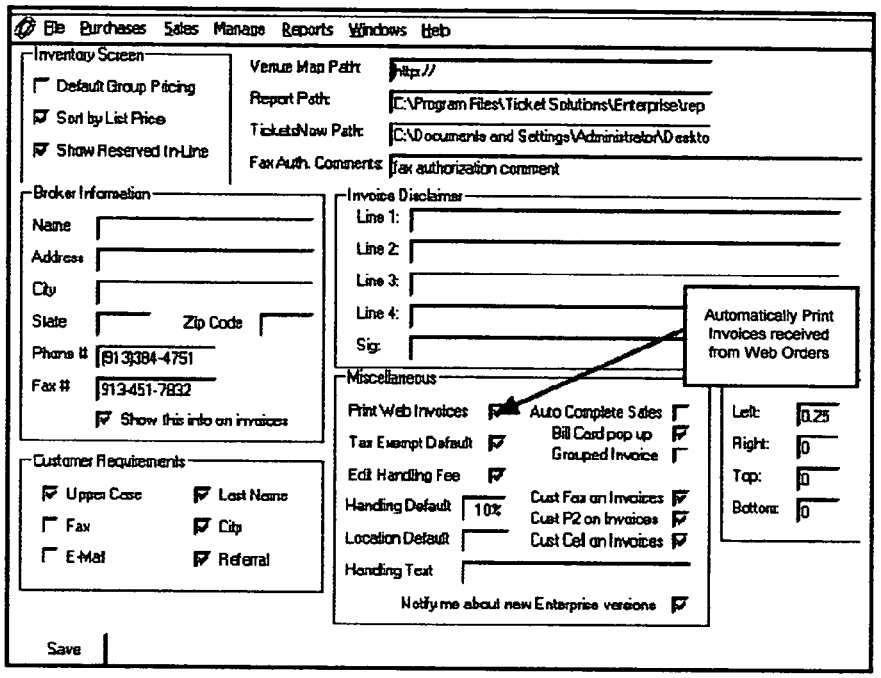

FIG. 10 is a flowchart showing a typical transaction handled by the POS system associated with a broker 12. The following description of the point-of-sale (POS) system and methodology applies to the management of transactions by a broker affiliate 12. FIG. 11 is a screen display of settings for a full-featured version of the software, including transactional defaults. FIG. 12 shows the settings screen for a reduced-feature version of the software, which implements the system and methodology of the present invention. FIG. 13 shows the screens for entering a new purchase order (PO). FIG. 14 shows the screen for searching POs. FIG. 15 shows the screen for creating mass PO tickets. FIG. 16 shows the screen for searching for mass POs, advanced quotes or cancelled POs. FIG. 17 shows the screen for advanced quotes. FIG. 18 shows the screen for the PO queue. FIG. 19 shows the sales screen for pending preorders, utilizing the value event pricing function described above. FIG. 20 shows the screen for order completion. FIG. 21 shows the inventory screen. The screen that is presented by selecting the "Set/Reserve" option is shown in FIG. 22.

Within the inventory/exchange grid different colors and icons can be used to provide certain information about the applicable tickets. For example, italics can indicate consignment inventory. Pink can identify reserved inventory. Green designates a block or group of tickets with section, row and seat information. Cost highlighted with yellow indicates that the PO has not yet been completed. NRT brokers are highlighted in yellow, and RT brokers are highlighted in green. The broker's name in pink indicates the broker's own tickets. "In" with a checkmark indicates that the tickets were added as "In Hand". "W" with a mouse icon indicates that the tickets are shared to the web. "X" with a red ticket icon indicates that the tickets are shared to the exchange. "Loc" indicates the office locations from which the tickets were added.

Figure 23:
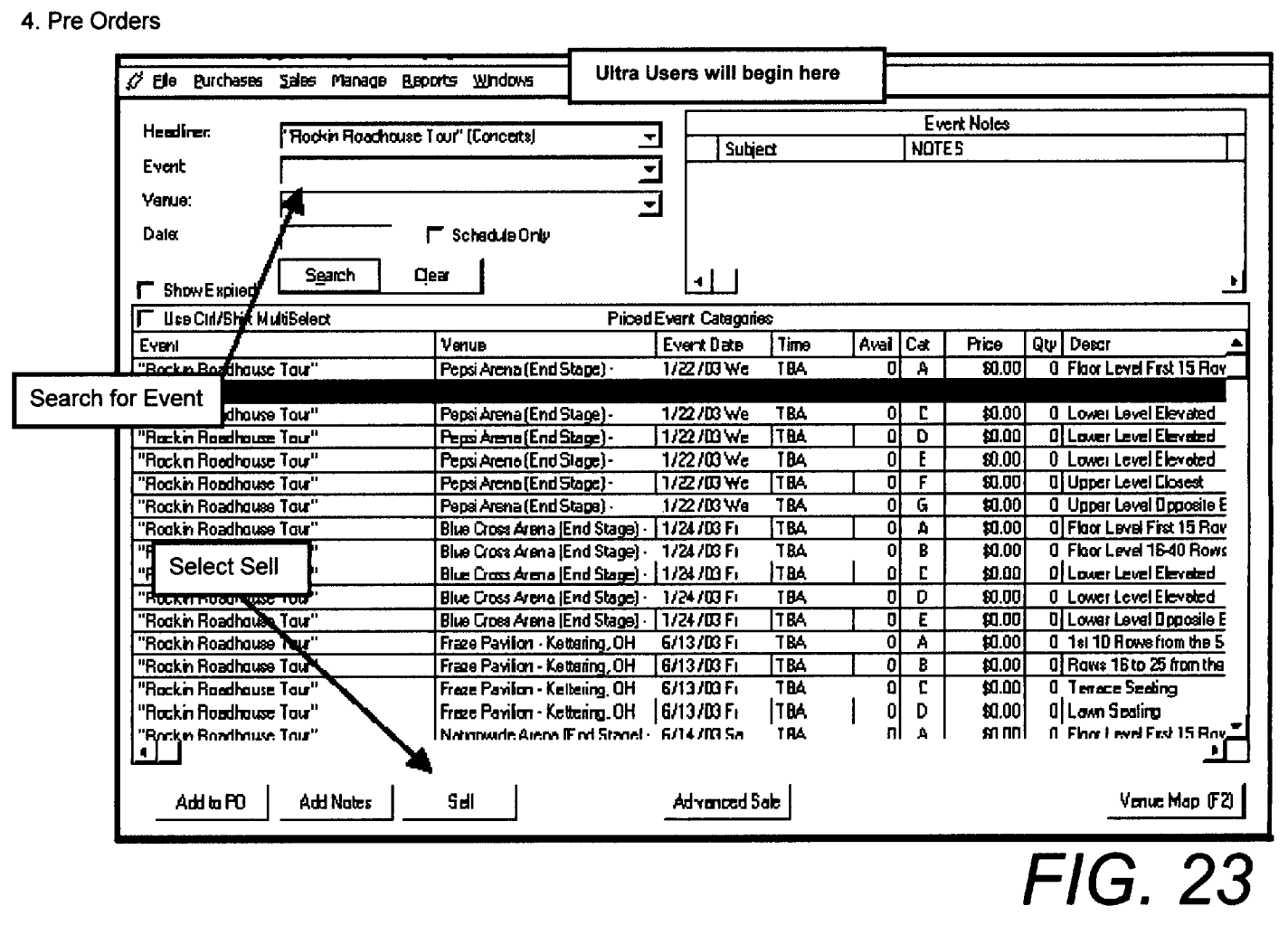
Figure 24:
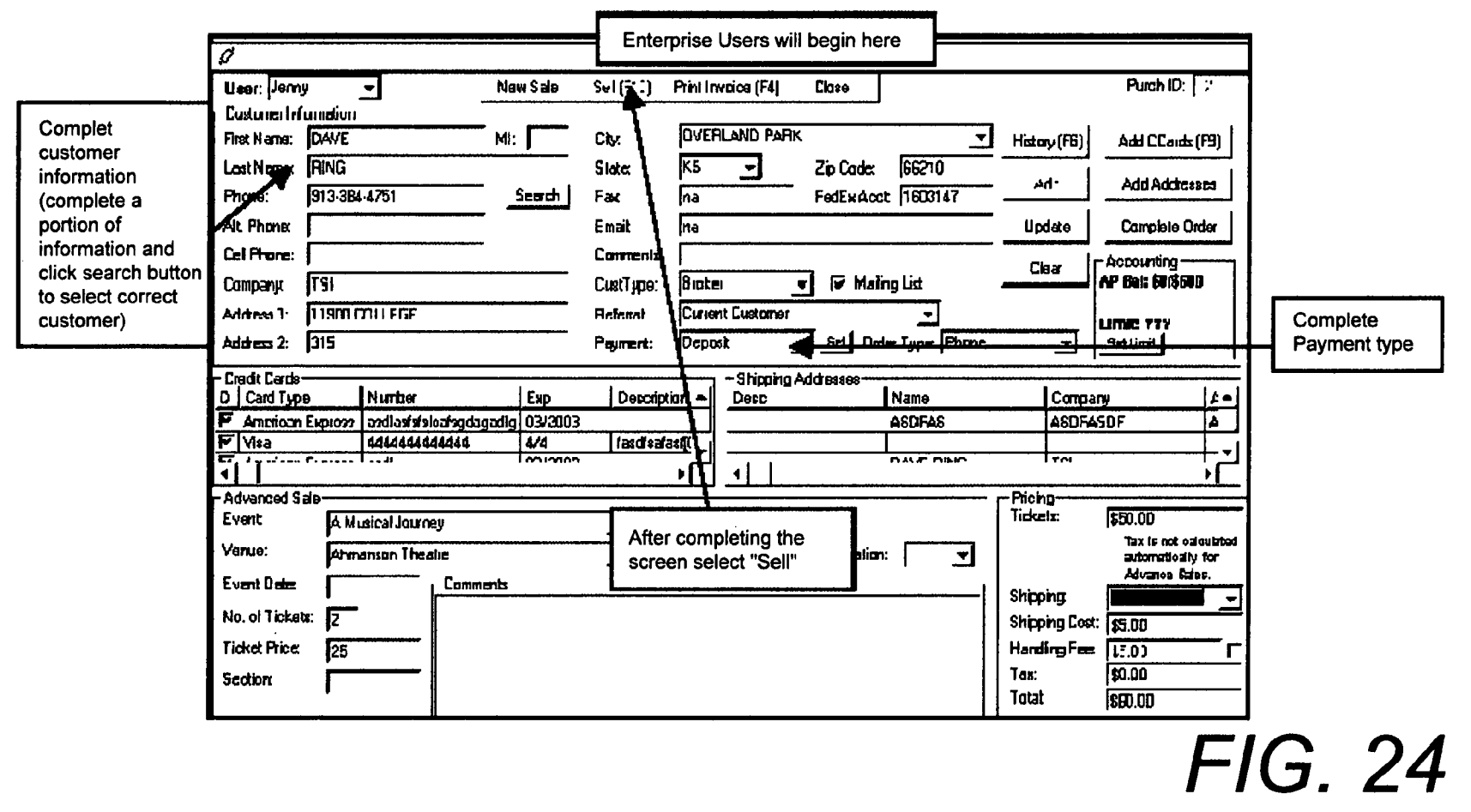
Figure 25:
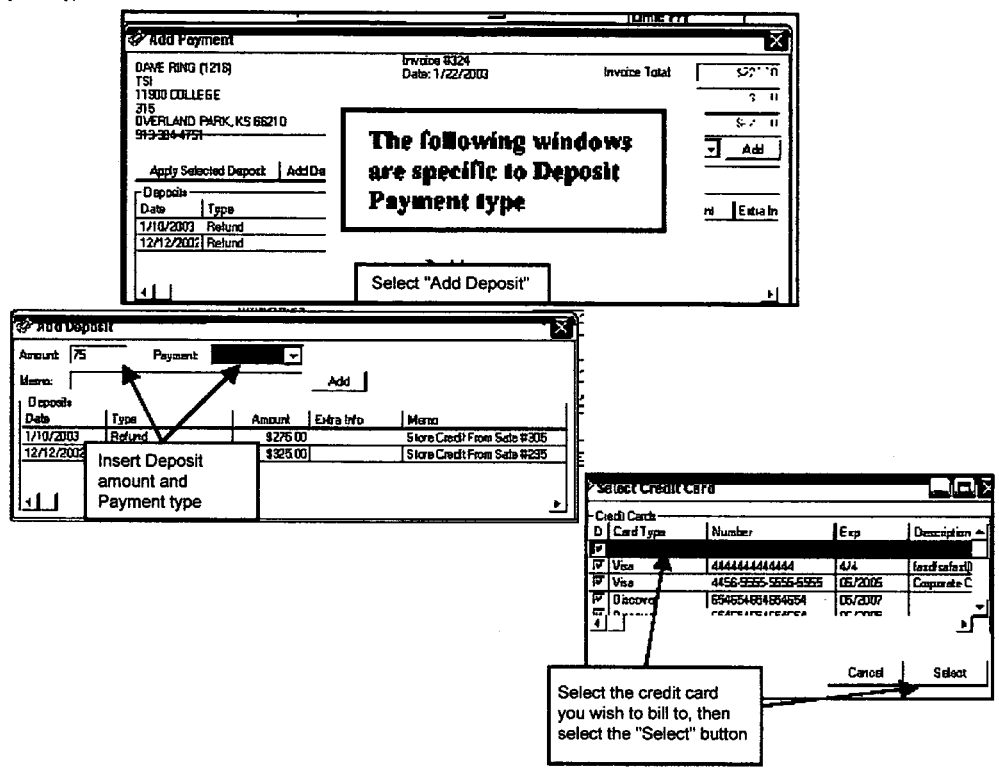
Figure 28:
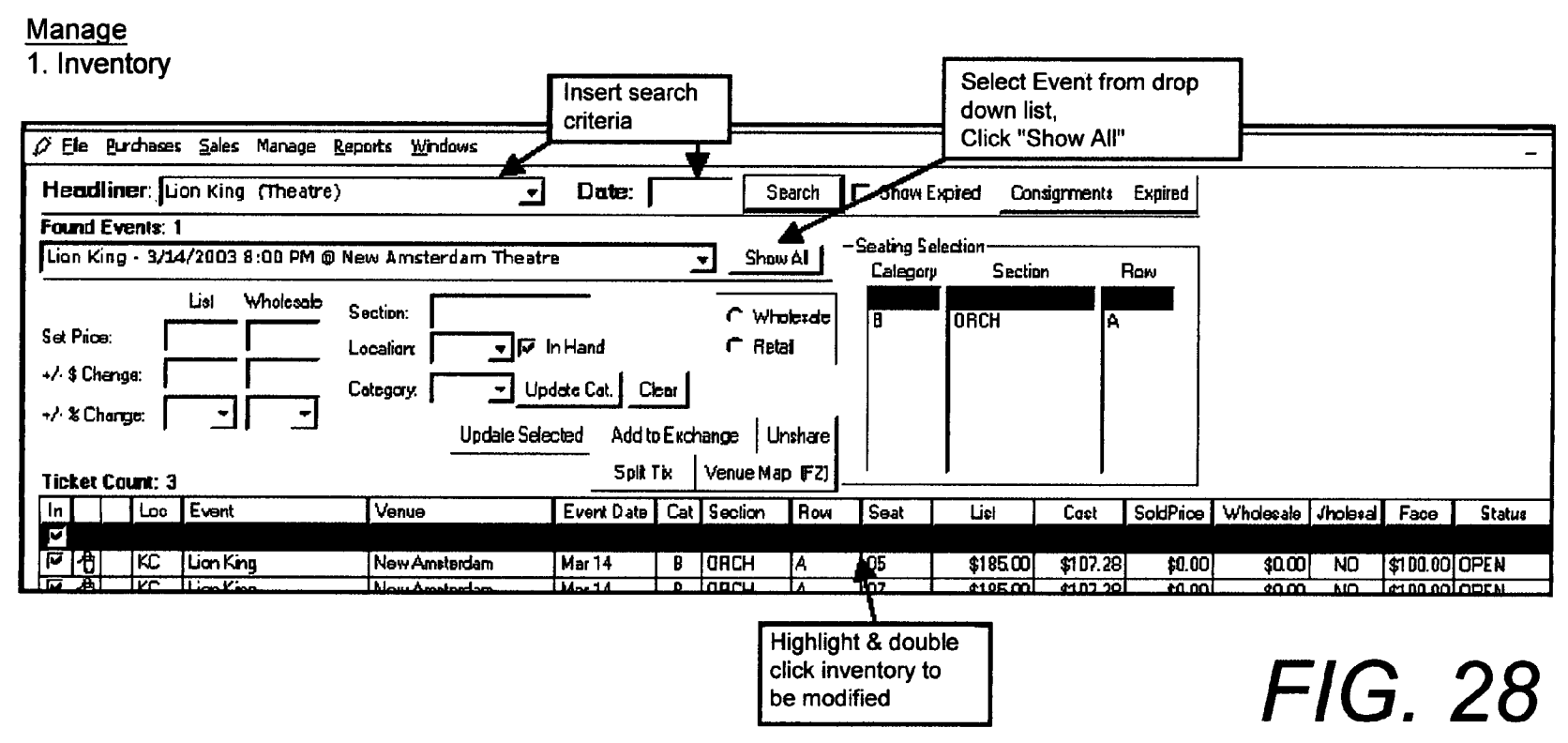
Figure 29:

FIG. 23 shows a pre orders screen, and FIG. 24 shows the comparable screen from the reduced-feature software version. FIG. 25 shows the screens that are applicable to types of deposit payments. FIG. 26 shows the screen for adding new customers, searching for customer information, modifying an existing sale or PO or creating a new sale. FIG. 27 shows the screen for retrieving exchange broker information. FIGS. 28 and 29 are inventory management screens.

Figure 33:
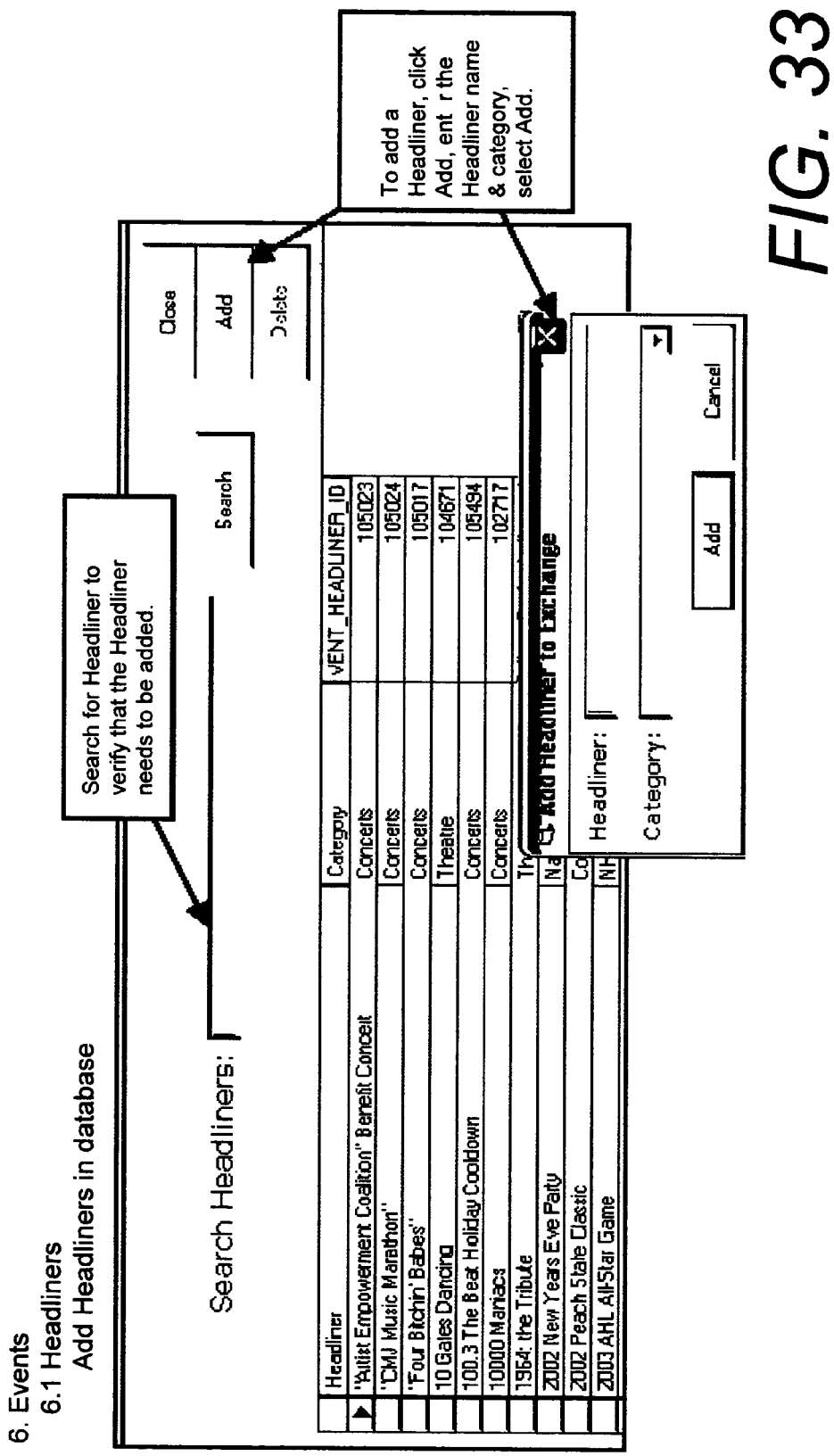
Figure 34:
Figure 35:

The system accommodates sharing tickets with other exchange systems through the screen shown in FIG. 30. Pre order pricing with price and quantity settings is shown in FIG. 31. FIG. 32 shows the screen for categorizing ticket inventory. FIG. 33 shows the screen for adding headliners for events to the brokers' databases. FIG. 34 shows the screen for adding, deleting and modifying options for customer types, office locations, shipping types and the discounts to the database. FIG. 35 is a referral list screen for adding and deleting customer referrals. FIG. 36 is a shopping cart screen. The brokerto-broker (B2B) screen FIG. 37 permits regulating payment types and reserved times individually for all of the brokers 12 who use the exchange.

Figure 38:
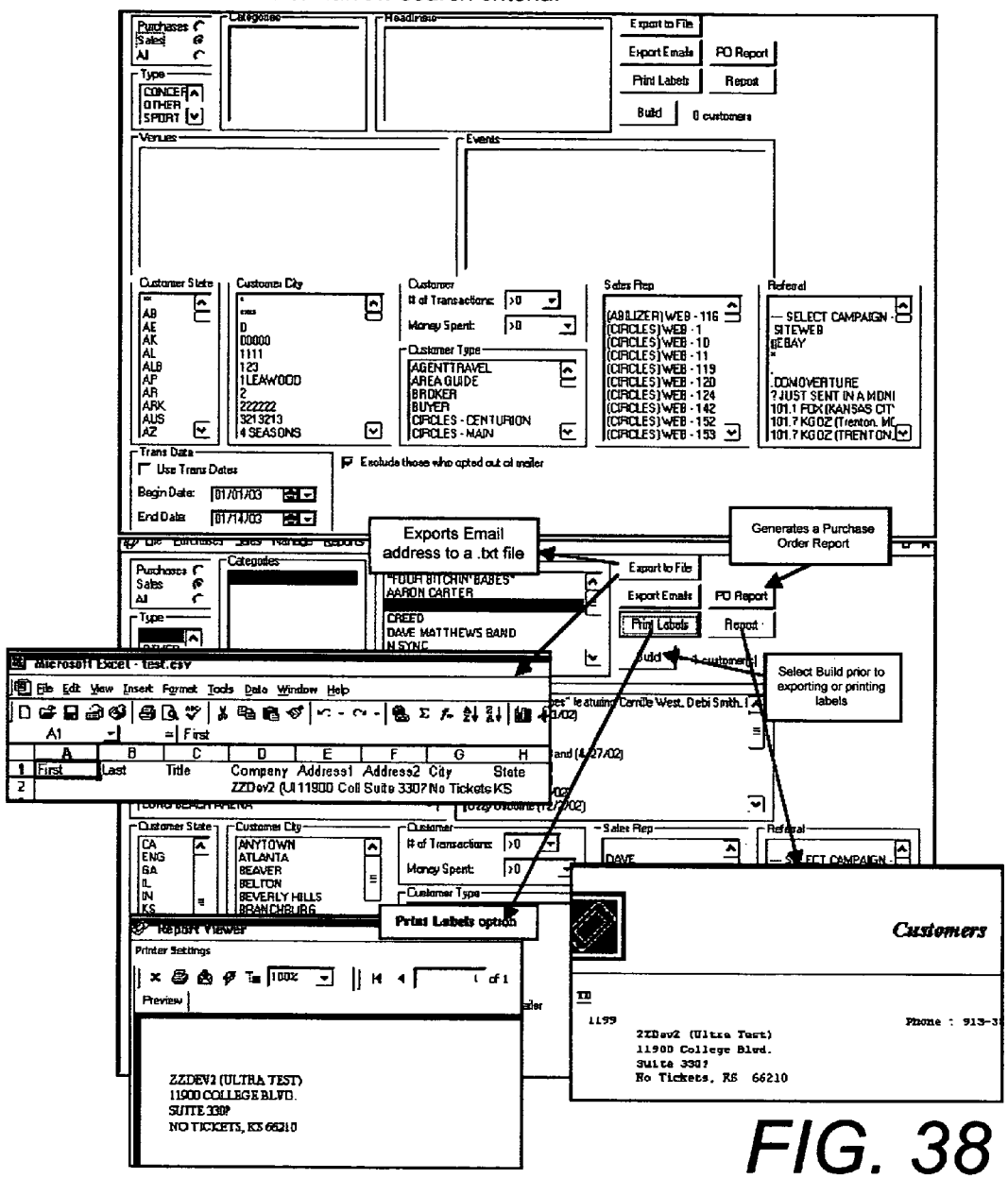
Figure 46:
Figure 48:
Figures 49, 50:
Figure 57:
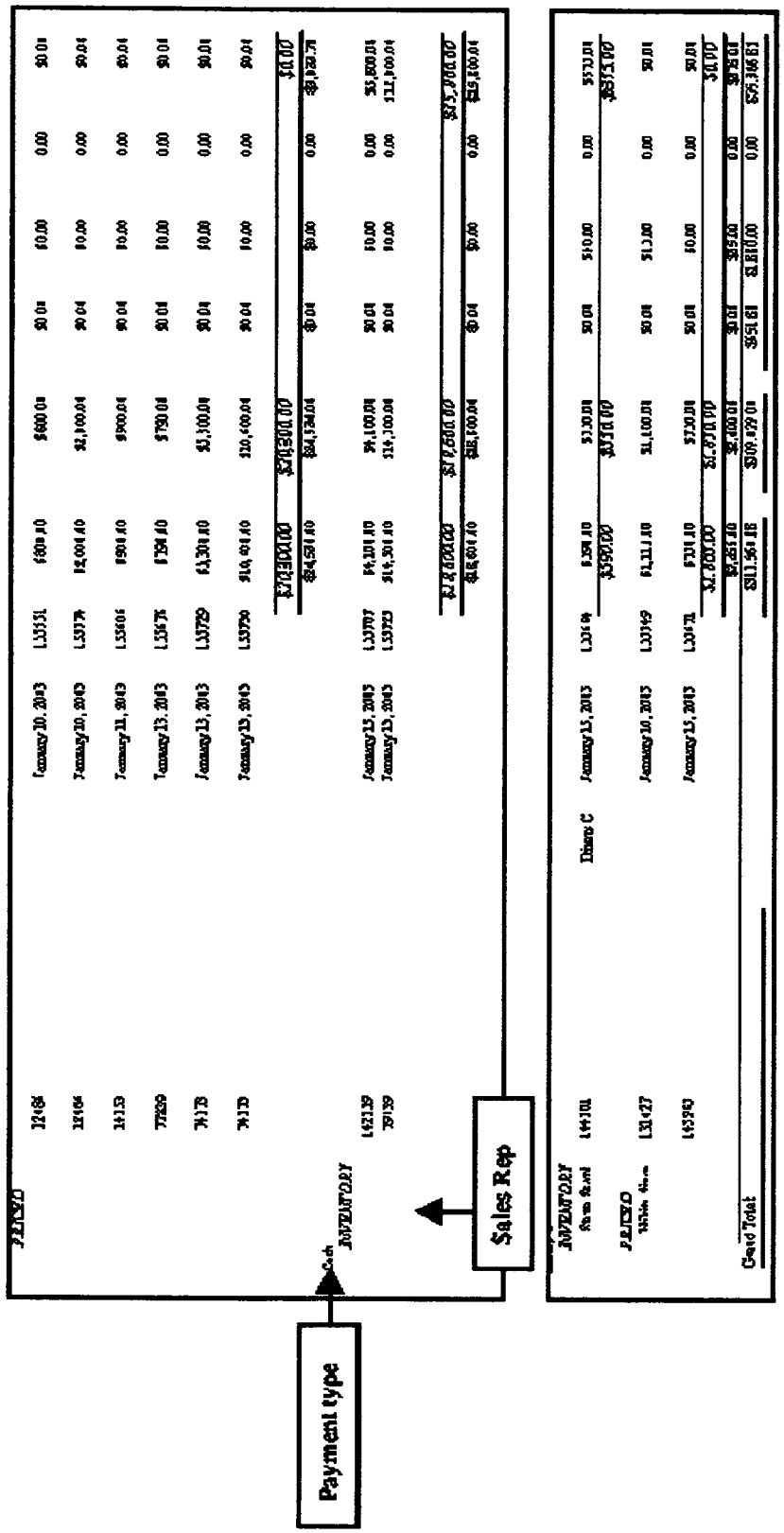
Figure 58:
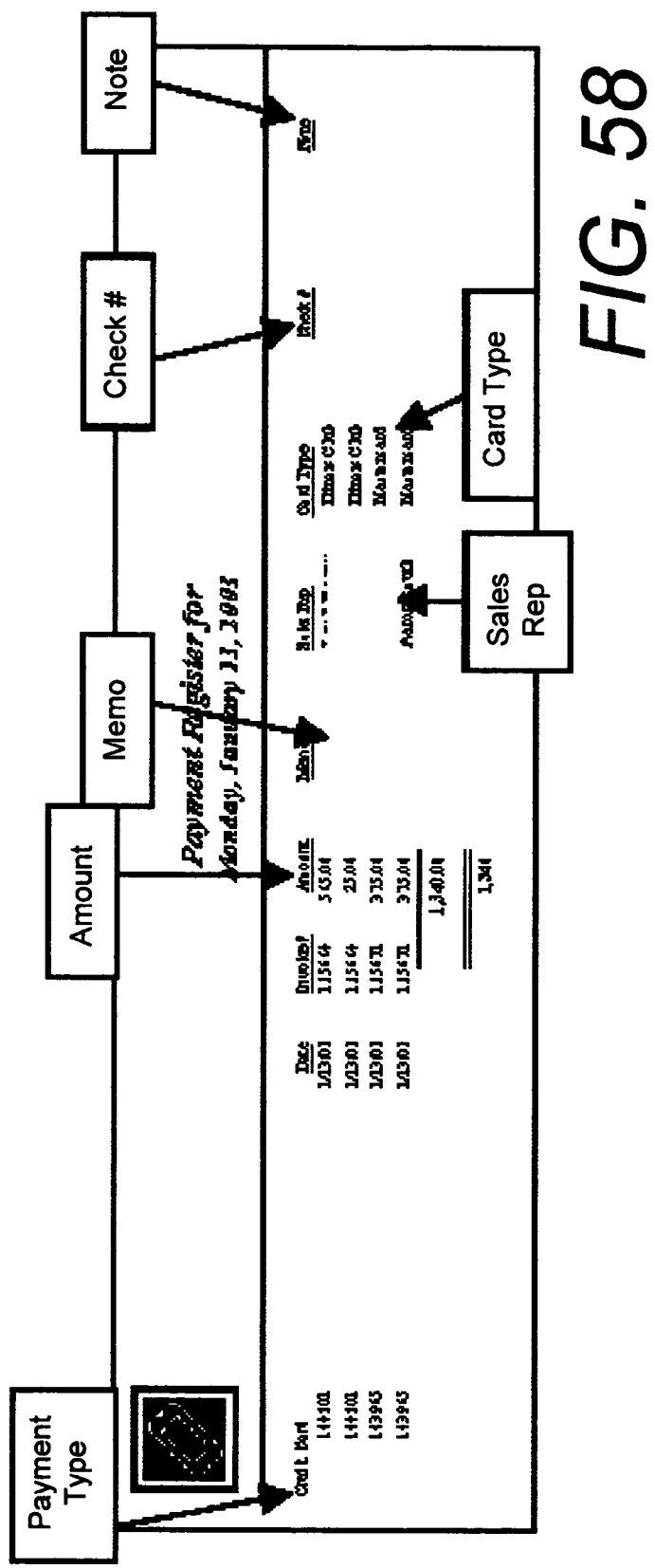
Figure 60:
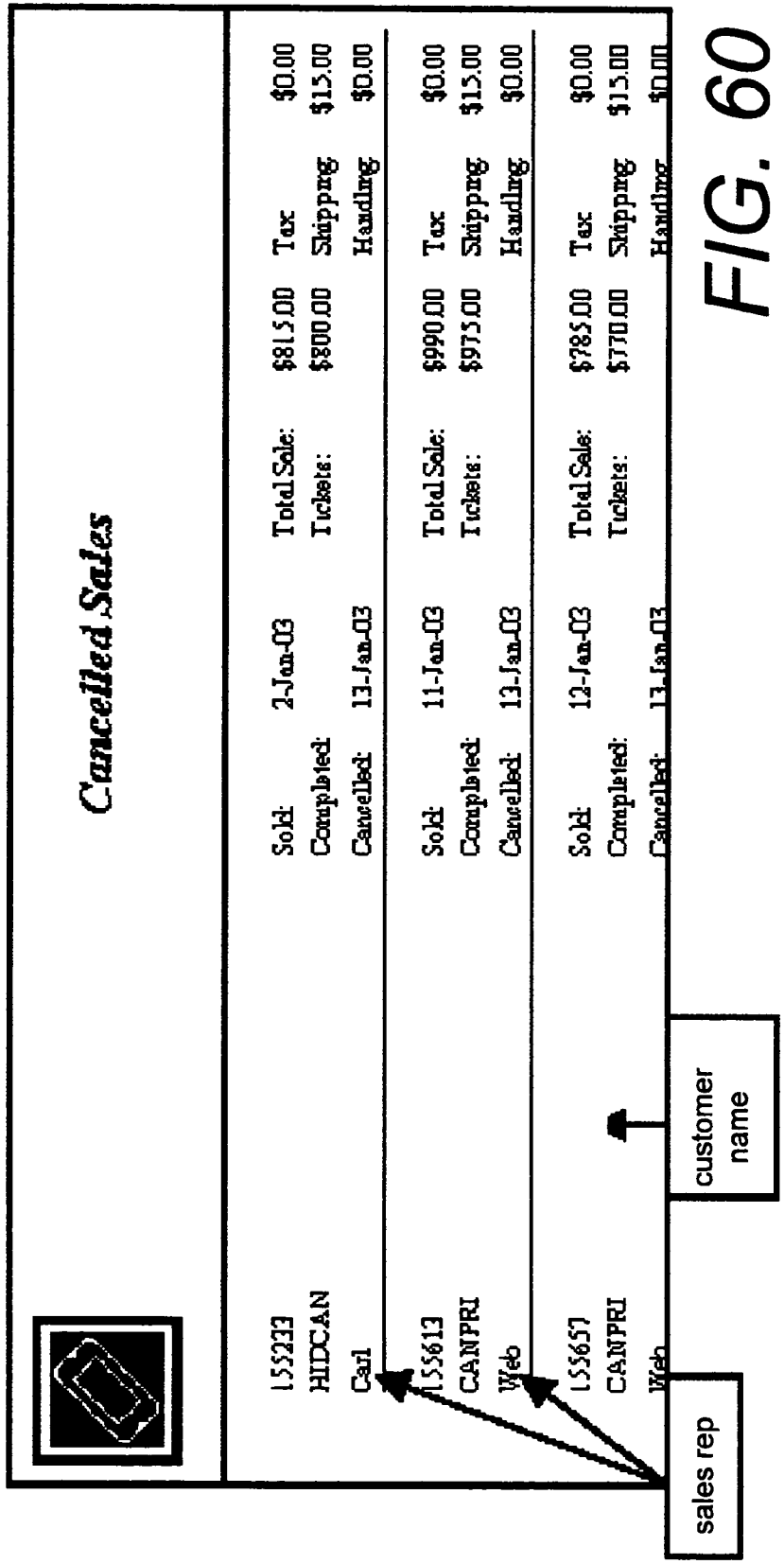
Figure 69:
Figure 72:
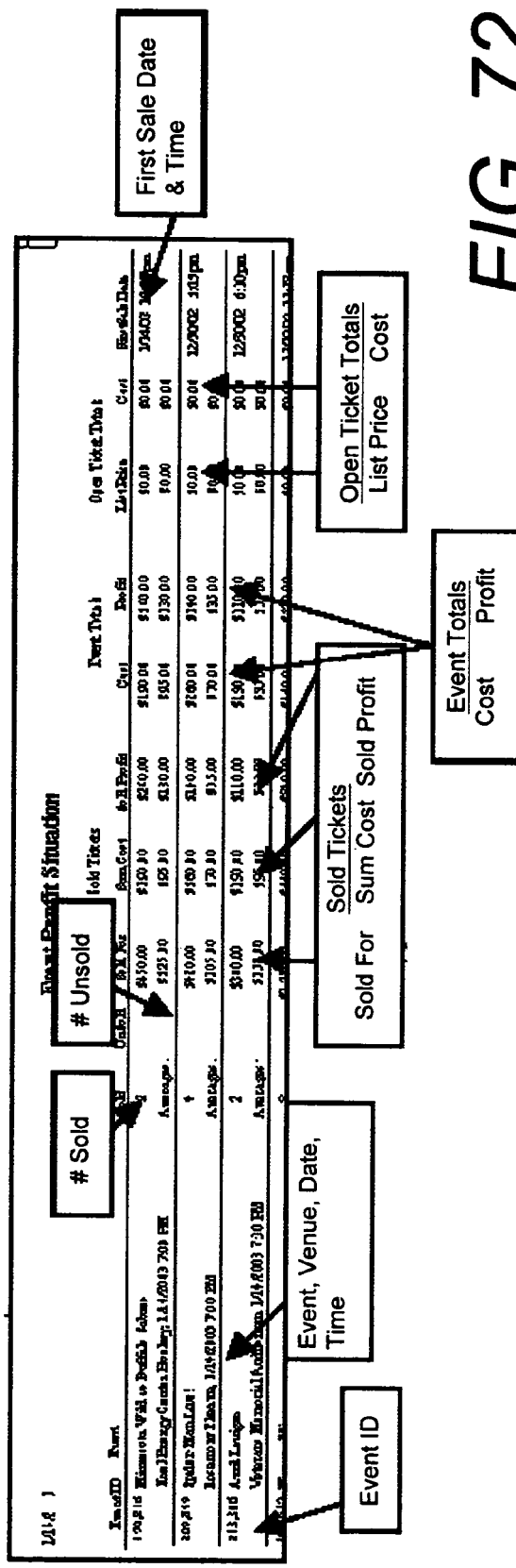
Figures 74, 75:
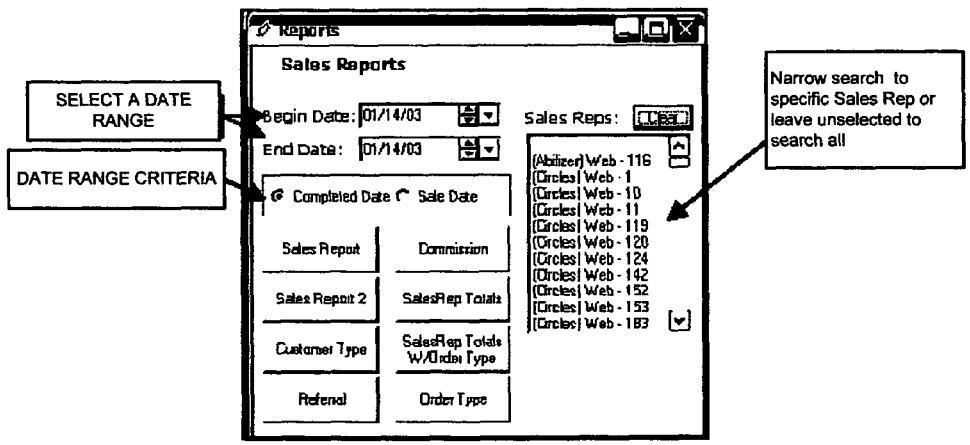
Figure 76:
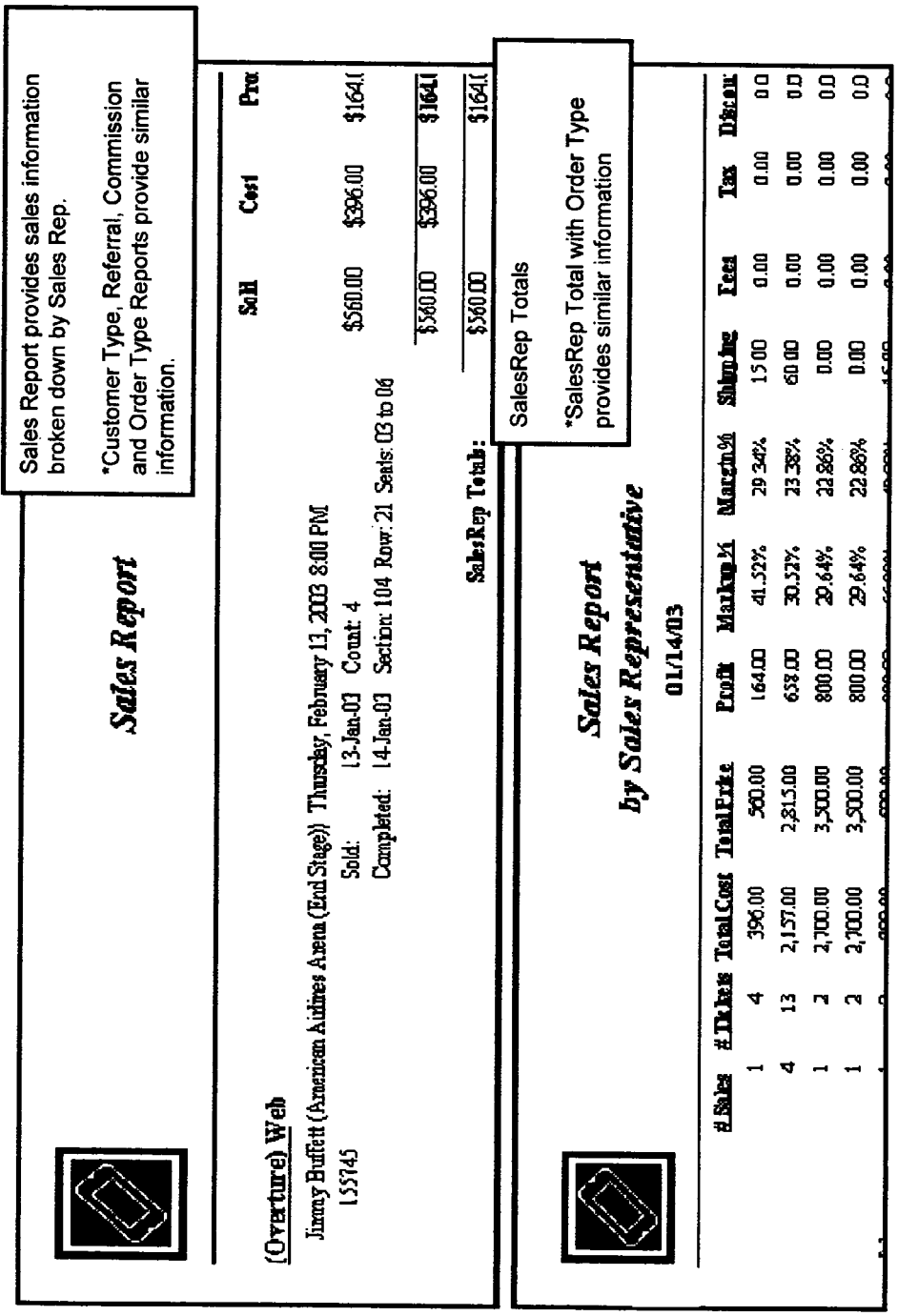

FIG. 38 is a report mailing list screen. FIG. 39 is a screen for event reporting and FIG. 40 shows current events. FIG. 41 is a sold tickets search utility and FIG. 42 shows a sold tickets report. FIG. 43 shows a reserve ticket list. FIG. 44 shows an expired inventory report, which is automatically generated. FIG. 45 shows an automatically generated report of tickets with no purchase orders. FIG. 46 shows an automatically generated sold tickets report. FIG. 47 shows a fax list search report. FIG. 48 shows a sample fax form. FIG. 49 shows a fax list for a number of days and FIG. 50 shows the automatically generated report. FIGS. 51-54 show shipping, invoice, PO and web sales register screens respectively. FIG. 55 shows exchange transactions. FIG. 56 shows sales by event and FIG. 57 shows sales by payment type. FIG. 58 shows daily payments and deposits. FIG. 59 shows daily purchases by payment type. FIG. 60 shows canceled orders. FIGS. 61 and 62 show tax information pertinent to the city of Chicago. FIG. 63 shows purchases for an event. FIG. 64 is an event picker. FIG. 65 shows purchase orders by event. FIG. 66 shows an example of a screen displaying event sales. FIG. 67 shows an event sales report. FIGS. 68-71. show weekly sales report information. FIG. 72 shows an event profit/situation screen. FIG. 73 shows selected events. FIG. 74 shows a daily total report. FIG. 75 shows a custom web sales representatives and dates report. FIG. 76 shows a sales report, including a breakdown by representative.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A method of managing transactions with multiple broker affiliates, each broker affiliate having an affiliate computer and an affiliate database connected thereto, which method comprises the steps of:

providing a central exchange computer system including an exchange server and an exchange database connected thereto;

connecting said exchange server to the affiliate computers of the broker affiliates via a distributed network;

receiving at said central exchange computer system information corresponding to goods and/or services available for sale to customers by the broker affiliates by uploading information stored in the affiliate databases to said exchange database via said distributed network;

storing in said exchange database the information corresponding to goods and/or services available for sale to customers by the broker affiliates and information concerning goods and/or services requested to purchase by customers;

maintaining a rules set at said central exchange computer system for an originating broker affiliate to identify goods and/or services available from the originating broker affiliate for sale to customers which are to be sold directly by the originating broker affiliate to customers and which are to be posted on a website of the originating broker affiliate and to identify goods and/or services available from the originating broker affiliate for sale to customers by other broker affiliates which are to be posted on respective websites of the other broker affiliates and made available for sale to customers by the other broker affiliates, said rules set specifying transaction conditions with respect to goods and/or services available from the originating broker affiliate for sale to customers by other broker affiliates for transactions conducted via said distributed network and specifying posting conditions for posting goods and/or services identified by the originating broker affiliate as available for sale to customers by the other broker affiliates on the respective websites of the other broker affiliates;

said broker affiliates controlling said rules set;

conducting real-time transactions involving goods and/or services available for sale to customers by the broker affiliates via said distributed network;

providing Internet (world wide web) access to said exchange server;

providing a web page and linking the web page to said affiliate computers;

providing a web-based bulletin board and access thereto by said broker affiliates;

posting to said web-based bulletin board the information corresponding to goods and/or services available for sale to customers by the broker affiliates and the information concerning goods and/or services requested to purchase by customers through the central exchange computer system;

preprogramming said central exchange computer system with said transaction conditions applicable to said broker affiliates for conducting transactions via said distributed network;

conducting transactions with respect to goods and/or services available for sale to customers by the broker affiliates via said distributed network according to said preprogrammed conditions;

managing transactions involving goods and/or services available from the originating broker affiliate for sale to customers by the other broker affiliates pursuant to said transaction conditions via a web inventory sharing function of the distributed network;

reporting data with respect to transactions across said distributed network to said central exchange computer system;

said distributed network handling transactions with respect to goods and/or services available for sale to customers by the broker affiliates and recording, reporting and storing data with respect to said transactions;

providing a special order system enabling broker affiliates to sell non-inventory goods and/or services not in their possession;

receiving via the distributed network purchase requests from customers for said non-inventory goods and/ or services;

distributing via the distributed network purchase requests for said non-inventory goods and/ or services;

sending a purchase request from a customer received by a selling broker affiliate to said exchange server via a web service;

said exchange server parsing and building request documents;

said exchange server sending said request back to said selling broker affiliate;

said originating broker affiliate sending goods and/or services information to said exchange server concerning said request;

said exchange server sending selling information concerning said goods and/or services to said customer;

said customer confirming purchase to said exchange service;

said exchange server sending a transaction confirmation to said customer; and said customer sending a transaction confirmation to said exchange server.

2. The method according to claim 1, which includes the additional steps of:
enabling broker affiliate control of splitting of grouped goods and/or services according to predetermined procedures; and
offering such grouped goods and/or services according to such predetermined procedures.

3. The method according to claim 1, which includes the additional steps of:
enabling broker affiliate control of credit card purchasing of goods and/or services from customers; and
inputting to said central exchange computer system credit card information from said customers for use in transactions.

4. The method according to claim 1 wherein said goods and/or services comprise tickets to entertainment and/or sports events.

5. The method according to claim 4 wherein said tickets are specified by event, venue, date and seating section.

6. A method of managing electronic commerce transactions involving tickets to events, the method comprising:
receiving at a central exchange computer system information corresponding to tickets available for sale to customers by broker affiliates of the central exchange computer system;
providing a web inventory sharing function at the central exchange computer system for posting tickets available from an originating broker affiliate for sale to customers on a website of the originating broker affiliate and on respective websites of other broker affiliates;
maintaining a rules set at the central exchange computer system for the originating broker affiliate to identify tickets available from the originating broker affiliate for sale to customers which are to be sold directly by the originating broker affiliate to customers and which are to be posted on the website of the originating broker affiliate and to identify tickets available from the originating broker affiliate for sale to customers by other broker affiliates which are to be posted on the respective websites of the other broker affiliates and made available for sale to customers by the other broker affiliates, the rules set specifying transaction conditions with respect to tickets available from the originating broker affiliate for sale to customers by the other broker affiliates and specifying posting conditions for posting tickets identified by the originating broker affiliate as available for sale to customers by the other broker affiliates on the respective websites of the other broker affiliates; and
managing electronic commerce transactions involving sales of tickets available from the originating broker affiliate posted on the respective websites of the other broker affiliates and sold to customers by the other broker affiliates in accordance with the transaction conditions via the web inventory sharing function of the central exchange computer system.

7. The method of claim 6, further comprising:
receiving information from the originating broker affiliate comprising one or more groups of tickets identified by the originating broker affiliate as available for sale directly to customers; and
sending the one or more groups of tickets identified by the originating broker affiliate as available for sale directly to customers for posting on the website of the originating broker affiliate.

8. The method of claim 7, wherein the one or more groups of tickets identified by the originating broker affiliate as available for sale directly to customers include a group of tickets identified by the originating broker affiliate as available for sale to customers by the other broker affiliates.

9. The method of claim 6, wherein one or more of the respective websites of the other broker affiliates are hosted by the central exchange computer system.

10. The method of claim 6, wherein the posting conditions identify broker affiliates which are allowed to show ticket groups of the originating broker affiliate and identify broker affiliates which are not allowed to show ticket groups of the originating broker affiliate.

11. The method of claim 6, wherein the posting conditions specify a required price markup.

12. The method of claim 6, further comprising posting one or more groups of tickets for sale that are not possessed by the originating broker affiliate.

13. The method of claim 12, further comprising:
receiving a purchase order involving one or more groups of tickets that are not possessed by the originating broker affiliate; and
managing an electronic commerce transaction conducted by the originating broker affiliate to procure tickets for fulfilling the purchase order.

14. One or more computer-readable storage devices storing executable computer program instructions that when executed cause a computer system to:
receive at a central exchange computer system information corresponding to tickets available for sale to customers by broker affiliates of the central exchange computer system;
provide a web inventory sharing function at the central exchange computer system for posting tickets available from an originating broker affiliate for sale to customers on a website of the originating broker affiliate and on respective websites of other broker affiliates;
maintain a rules set at the central exchange computer system for the originating broker affiliate to identify tickets available from the originating broker affiliate for sale to customers which are to be sold directly by the originating broker affiliate to customers and which are to be posted on the website of the originating broker affiliate and to identify tickets available from the originating broker affiliate for sale to customers by other broker affiliates which are to be posted on the respective websites of the other broker affiliates and made available for sale to customers by the other broker affiliates, the rules set specifying transaction conditions with respect to tickets available from the originating broker affiliate for sale to customers by the other broker affiliates and specifying posting conditions for posting tickets identified by the originating broker affiliate as available for sale to customers by the other broker affiliates on the respective websites of the other broker affiliates; and
manage electronic commerce transactions involving sales of tickets available from the originating broker affiliate posted on the respective websites of the other broker affiliates and sold to customers by the other broker affiliates in accordance with the transaction conditions via the web inventory sharing function of the central exchange computer system.

15. The one or more computer-readable storage devices of claim 14, further comprising computer program instructions that when executed cause the computer system to:

receive information from the originating broker affiliate comprising one or more groups of tickets identified by the originating broker affiliate as available for sale directly to customers; and send the one or more groups of tickets identified by the originating broker affiliate as available for sale directly to customers for posting on the website of the originating broker affiliate.

16. The one or more computer-readable storage devices of claim 14, further comprising computer program instructions that when executed cause the computer system to host one or more of the respective websites of the other broker affiliates.

17. The one or more computer-readable storage devices of claim 14, wherein the posting conditions identify broker affiliates which are allowed to show ticket groups of the originating broker affiliate and specify whether a price markup is required.

18. The one or more computer-readable storage devices of claim 14, further comprising computer program instructions that when executed cause the computer system to post one or more groups of tickets for sale that are not possessed by the originating broker affiliate.

19. The one or more computer-readable storage devices of claim 18, further comprising computer program instructions that when executed cause the computer system to:

receive a purchase order involving one or more groups of tickets that are not possessed by the originating broker affiliate; and manage an electronic commerce transaction conducted by the originating broker affiliate to procure tickets for fulfilling the purchase order.

20. The one or more computer-readable storage devices of claim 15, wherein the one or more groups of tickets identified by the originating broker affiliate as available for sale directly to customers include a group of tickets identified by the originating broker affiliate as available for sale to customers by the other broker affiliates.

* * * * *